US005672019A

United States Patent [19]

Hiramatsu et al.

[11] Patent Number: 5,672,019
[45] Date of Patent: Sep. 30, 1997

[54] SHEET SUPPLYING APPARATUS

[75] Inventors: Soichi Hiramatsu, Hachioji; Tetsuo Suzuki, Yokohama; Masahiro Taniguro, Yokohama; Hiroyuki Saito, Yokohama; Haruyuki Yanagi, Machida; Takashi Nojima, Tokyo; Satoshi Saikawa, Inagi; Hiroyuki Kinoshita, Kawasaki; Hideaki Kawakami, Yokohama, all of Japan

[73] Assignee: Canon Kabushiki Kaisha, Tokyo, Japan

[21] Appl. No.: 716,091

[22] Filed: Sep. 19, 1996

Related U.S. Application Data

[63] Continuation of Ser. No. 127,601, Sep. 28, 1993, abandoned.

[30] Foreign Application Priority Data

Sep. 30, 1992 [JP] Japan ................................. 4-286943

[51] Int. Cl.⁶ .................................................. B41J 11/58
[52] U.S. Cl. ............................ 400/624; 400/629; 271/902
[58] Field of Search .................................. 400/624, 625, 400/629, 630, 185; 271/242, 902, 9.02

[56] References Cited

U.S. PATENT DOCUMENTS

| 4,687,362 | 8/1987 | Runzi | 400/630 |
|---|---|---|---|
| 4,743,132 | 5/1988 | Chikata et al. | 400/625 |
| 4,789,259 | 12/1988 | Katayanagi | 400/625 |
| 4,865,305 | 9/1989 | Momiyama et al. | 400/625 |
| 4,929,105 | 5/1990 | Hirayama et al. | 400/625 |
| 4,990,011 | 2/1991 | Underwood et al. | 271/242 |
| 5,160,128 | 11/1992 | Oishi | 271/114 |
| 5,222,724 | 6/1993 | Hirano et al. | 271/242 |
| 5,226,743 | 7/1993 | Jackson et al. | 400/625 |

FOREIGN PATENT DOCUMENTS

| 495109 | 7/1992 | European Pat. Off. . | |
|---|---|---|---|
| 505969 | 9/1992 | European Pat. Off. . | |
| 62-225374 | 10/1987 | Japan | 400/279 |
| 1-280575 | 11/1989 | Japan | 400/185 |
| 3-005181 | 1/1991 | Japan | 400/279 |

*Primary Examiner*—David A. Wiecking
*Attorney, Agent, or Firm*—Fitzpatrick, Cella, Harper & Scinto

[57] ABSTRACT

A sheet supplying apparatus comprises sheet supporting means for supporting a sheet, rotary supply means for feeding out the sheet, rotary convey means for conveying the sheet by a predetermined amount and then for effecting the registration of the sheet by a reverse rotation, drive means for driving the rotary convey means in a normal direction and a reverse direction, a switching output gear connected to the drive means so that a driving force from the drive means is transmitted to the switching output gear, and switching means for engaging the switching output gear with an input gear connected to the rotary supply means to transmit a rotational driving force of the rotary convey means to the rotary supply means, and for disengaging the switching output gear from the input gear.

15 Claims, 30 Drawing Sheets

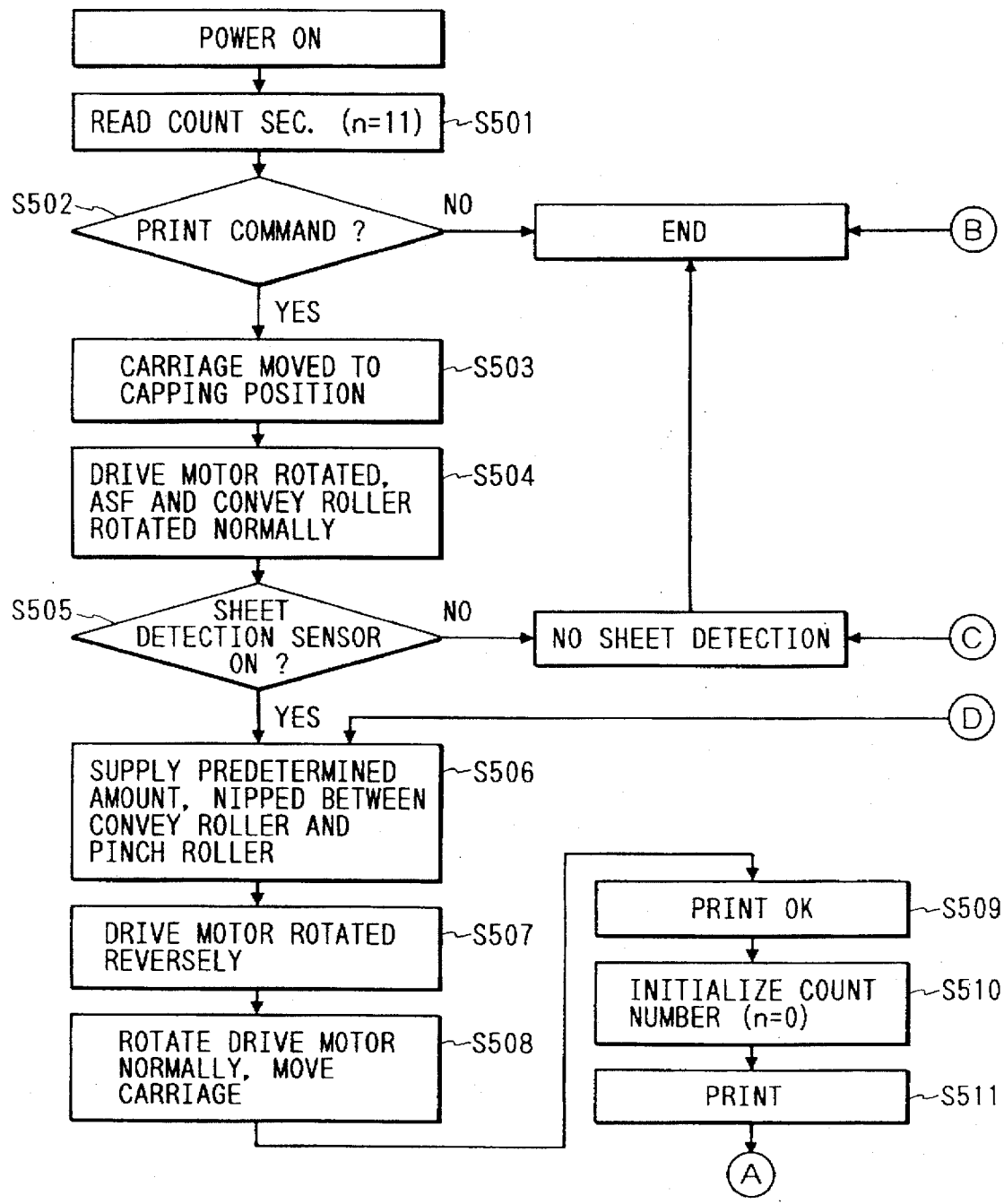

SHEET SUPPLYING APPARATUS

This application is a continuation of application Ser. No. 08/127,601 filed Sep. 28, 1993, now abandoned.

BACKGROUND OF THE INVENTION

1. Field of the Invention

The present invention relates a sheet supplying apparatus for automatically supplying sheets one by one.

2. Related Background Art

Conventional recording apparatus such as printers, copying machines and facsimile machine are designed so that an image is recorded on a recording sheet (referred to as "sheet" hereinafter) such as a paper sheet or a plastic thin film on the basis of image information. Such recording apparatuses can be grouped into an ink jet type, a wire dot type, a thermal type, an electrophotographic type and the like, in dependence upon recording types. In such recording apparatuses, the supply of the sheet can be effected by manually supplying the sheet one by one or by automatically and continuously supplying sheets by using a sheet supplying apparatus.

In some conventional sheet supplying apparatuses, for example, a sheet is fed out from a sheet stack by a supply means such as a sheet supply roller, and the sheet supplied by the supply means is registrated by a convey means such as a convey roller in the way of the sheet conveyance, and then the sheet is sent to a recording apparatus. In a certain apparatus among these sheet supplying apparatuses, the sheet supply roller and the convey roller are driven by a single motor so that a driving force of the convey roller is transmitted to the sheet supply roller by a driving force transmitting means such as a gear train.

Further, regarding the registration of the sheet by means of the convey roller, the sheet supplied by the sheet supply roller is firstly fed out by the convey roller by a predetermined amount, and then a loop is formed in the sheet between the sheet supply roller and the convey roller by rotating the convey roller reversely, and the sheet is registered by abutting a leading end of the sheet against a nip of the convey roller. In this case, when the convey roller is rotated reversely, if the sheet supply roller is also rotated reversely, the loop cannot be formed in the sheet, thereby making the registration of the sheet impossible. Accordingly, during the reverse rotation of the convey roller, the sheet supply roller must be stopped. Thus, conventionally, a means such as an electromagnetic clutch for electrically and selectively transmitting and blocking the driving force was incorporated into the driving force transmitting means such as the gear train for transmitting the driving force of the convey roller to the sheet supply roller so that the reverse rotational force of the convey roller was not transmitted to the sheet supply roller.

However, when the complicated means such as the electromagnetic clutch is incorporated into the driving force transmitting means, the apparatus becomes expensive and a control mechanism becomes complicated.

SUMMARY OF THE INVENTION

An object of the present invention is to provide a sheet supplying apparatus which is simple in construction and in which a driving force of a convey roller is not transmitted to a sheet supply roller during a reverse rotation of the convey roller without any complicated control mechanism.

To achieve the above object, according to one aspect of the present invention, a sheet supplying apparatus comprises a sheet supporting means for supporting a sheet, a rotary sheet supply means for feeding out the sheet supported by the sheet supporting means, a rotary convey means for conveying the sheet fed out by the sheet supply means by a predetermined amount and then for effecting the registration of the sheet by a reverse rotation of the convey means, a drive means for driving the rotary convey means in a normal direction and a reverse direction, a switching output gear connected to the drive means so that a driving force from the drive means is transmitted to the switching output gear, and a switching means for engaging the switching output gear with an input gear connected to the rotary sheet supply means to transmit the rotational driving force of the rotary convey means to the rotary sheet supply means when the rotary convey means is rotated in the normal direction and for disengaging the switching output gear from the input gear when the rotary convey means is rotated in the reverse direction.

The switching means comprises a pivotable arm to which the switching output gear is attached so that the switching output gear is engaged by the input gear when the rotary convey means is rotated in the normal direction and the switching output gear is disengaged from the input gear when the rotary convey means is rotated in the reverse direction.

Alternatively, the switching means may comprise a slide shaft for slidingly supporting the switching output gear so that the switching output gear is shifted to be engaged by the input shaft when the rotary convey means is rotated in the normal direction and the switching output gear is shifted to be disengaged from the input gear when the rotary convey means is rotated in the reverse direction.

With the arrangement as mentioned above, since the transmission of the driving force is controlled by the engagement and disengagement between the gears, it is possible to provide an inexpensive apparatus without any complicated part such as an electromagnetic clutch.

According to another aspect of the present invention, there is provided a sheet supplying means comprises a sheet supporting means for supporting a sheet, a rotary sheet supply means for feeding out the sheet supported by the sheet supporting means, a rotary convey means for conveying the sheet fed out by the sheet supply means by a predetermined amount and then for effecting the registration of the sheet by a reverse rotation of the convey means, a drive means for driving the rotary convey means in a normal direction and a reverse direction, a switching output gear shifted to be engaged with an input gear connected to the rotary sheet supply means so that a rotational driving force of the rotary convey means is transmitted to the rotary sheet supply means when the rotary convey means is rotated in the normal direction and shifted to be disengaged from the input gear when the rotary convey means is rotated in the reverse direction for the registration of the sheet, and a control means for controlling the drive means on the basis of the number of pulses which minimizes a driving force non-transmitting time period until the separated switching output gear is engaged by the input gear during a reverse movement of the drive means.

The number of pulses of the drive means which minimizes the driving force non-transmitting time period may be set so that the phases of the switching output gear and the input gear coincide with each other when these gears are engaged by each other.

With this arrangement, when the rotary convey means conveys the sheet after the registration of the sheet, since the transmission of the driving force to the rotary sheet supply means can be effected quickly, it is possible to prevent the rotary sheet supply means from urging the sheet due to the delay transmission of the driving force to the rotary sheet supply means, thereby preventing the slit of the sheet. Thus, the heading or protrusion of a leading end of the sheet is stabilized, thereby obtaining a good image.

BRIEF DESCRIPTION OF THE DRAWINGS

FIGS. 27 to 29 comprising FIGS. 29A and 29B, are flow charts for explaining the operation of the sheet supplying apparatus according to the third embodiment of the present invention.

DETAILED DESCRIPTION OF THE PREFERRED EMBODIMENTS

Figure 1:
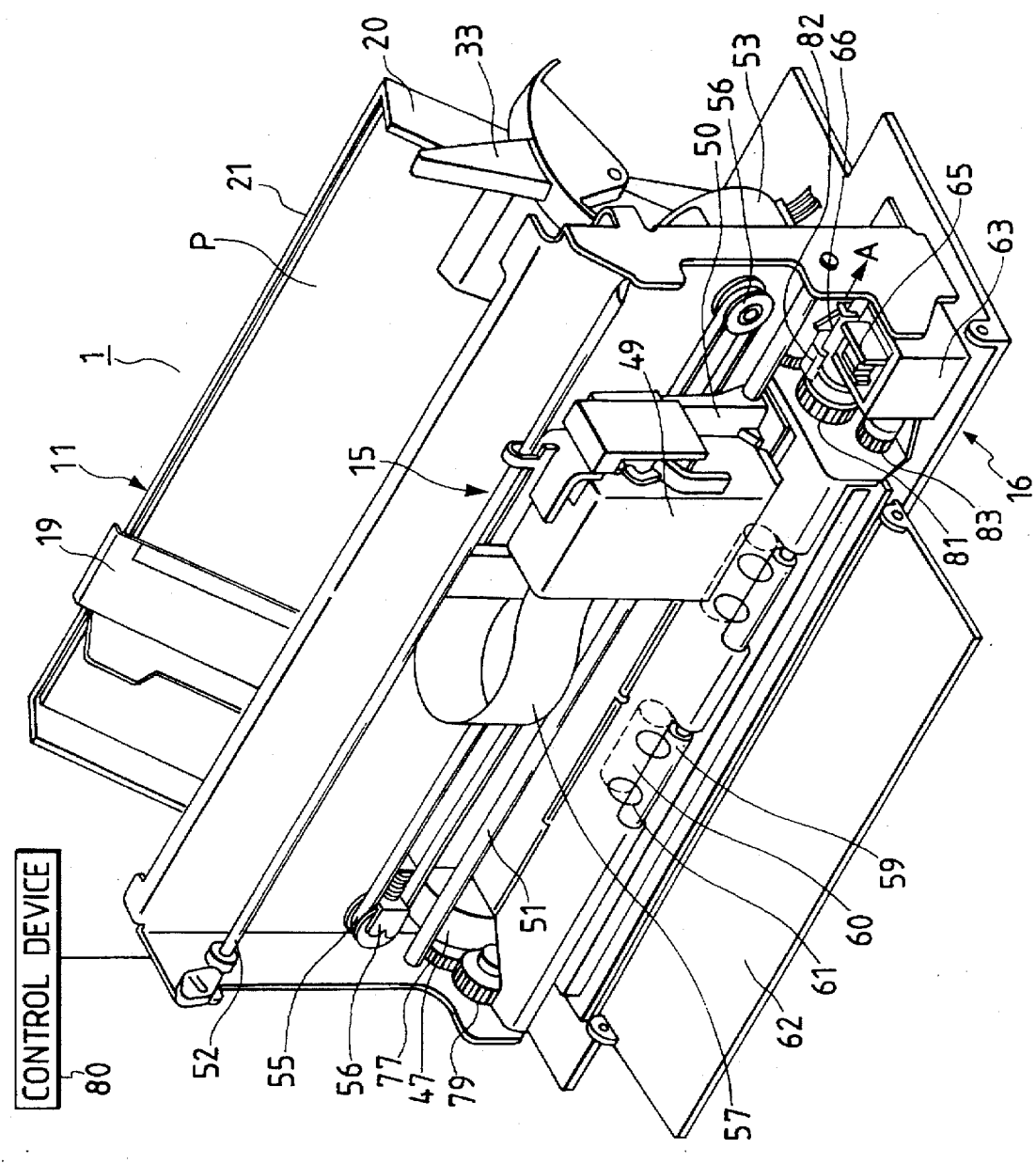
FIG. 1 is a perspective view of a recording apparatus including a sheet supplying apparatus according to a first embodiment of the present invention.

First of all, a first embodiment of the present invention will be explained with reference to FIGS. 1 to 14F.

In FIGS. 1 to 7, a sheet supply portion 11 is attached to a body of a recording apparatus at an angle of 30 to 60 degrees. Sheets P set in the sheet supply portion 11 can be discharged horizontally after the recording. The sheet supply portion 11 comprises a sheet supply roller 5, a separating claw 17, a movable side guide 19, a base 20, a pressure plate 21, pressure plate springs 22, drive gears 25 to 30, a release cam 31, a claw spring 32, a releasing lever 33 and a releasing cam 35. Normally, the pressure plate 21 is urged downwardly to a position shown in FIG. 6 by the release cam 31, so that the sheet stack P is separated from the sheet supply roller 5.

Figure 4:
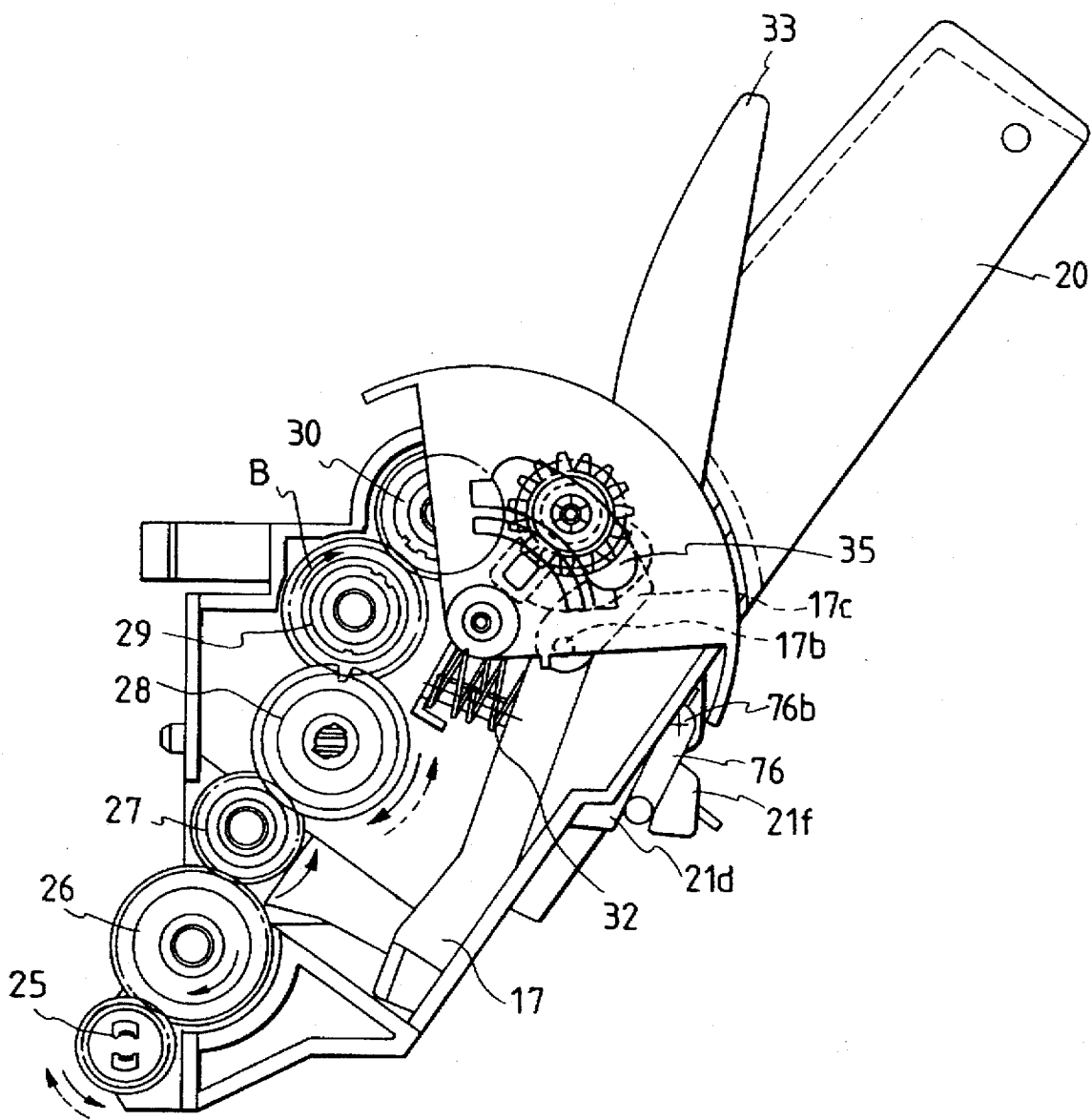
FIG. 4 is a side view of the sheet supplying apparatus of FIG. 1.
Figure 5:
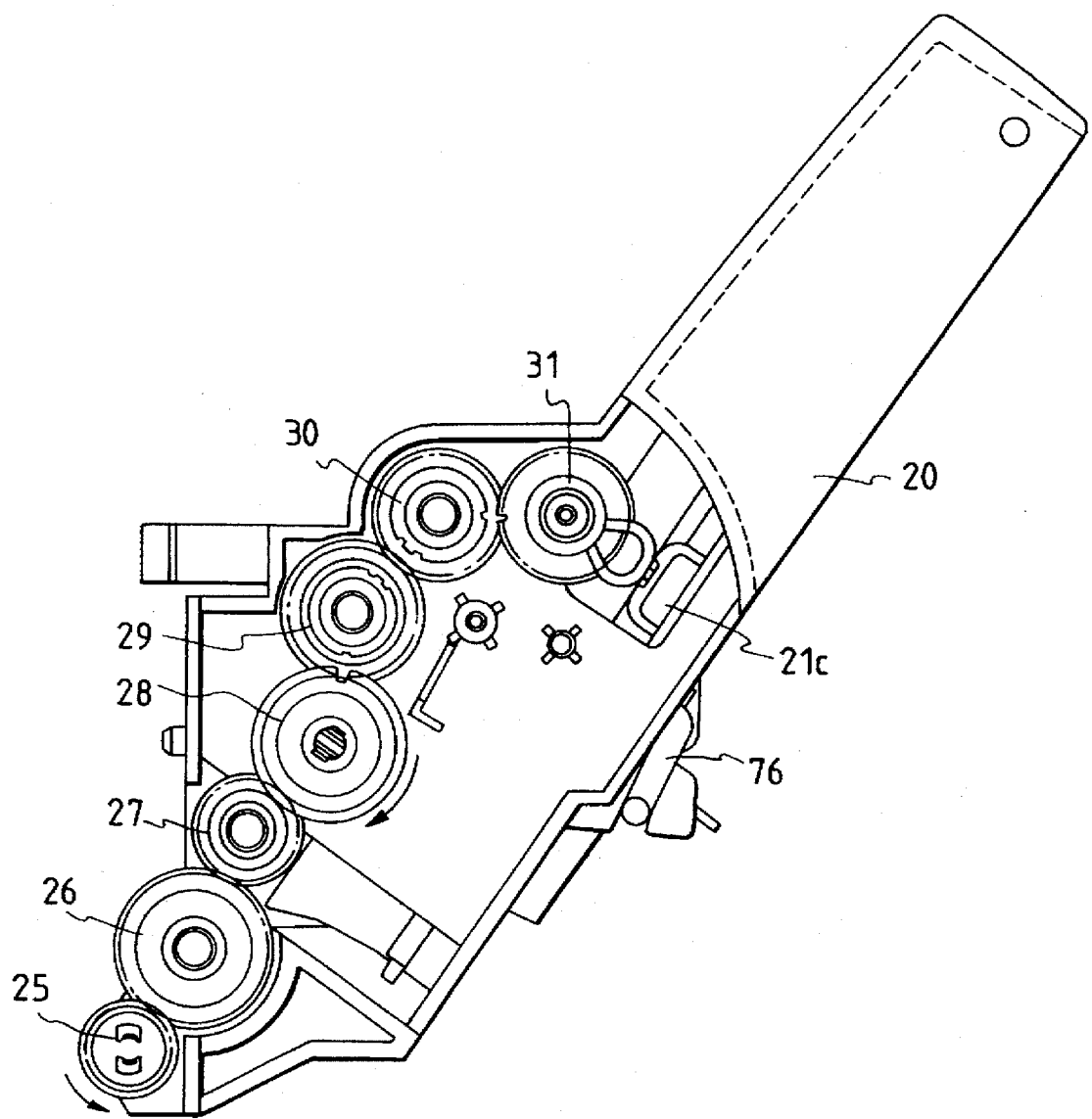
FIG. 5 is a view showing a gear train for transmitting a driving force in the sheet supplying apparatus of FIG. 1.

In a condition that the sheets P are set, a driving force of a convey roller 36 is transmitted to the sheet supply roller 5 and the release cam 31 via the gears 25 to 30 shown in FIGS. 4 and 5. When the release cam 31 is separated from the pressure plate 21, the pressure plate 21 is lifted to a position shown in FIG. 7 so that the sheet stack P is contacted with the sheet supply roller 5. As a result, the sheets are fed out by the rotation of the sheet supply roller 5 and are separated one by one by the separating claw 17. The separated sheet P is sent to a sheet feeding portion 12. The sheet supply roller 5 and the release cam 31 are rotated by one revolution until the sheet P is sent to the sheet feeding portion 12, and the release cam urges the pressure plate downwardly again to separate the pressure plate 21 from the sheet supply roller 5. In this condition, the driving force from the convey roller 36 to the sheet supply roller 5 is interrupted, thereby maintaining the initial condition.

Figure 2:
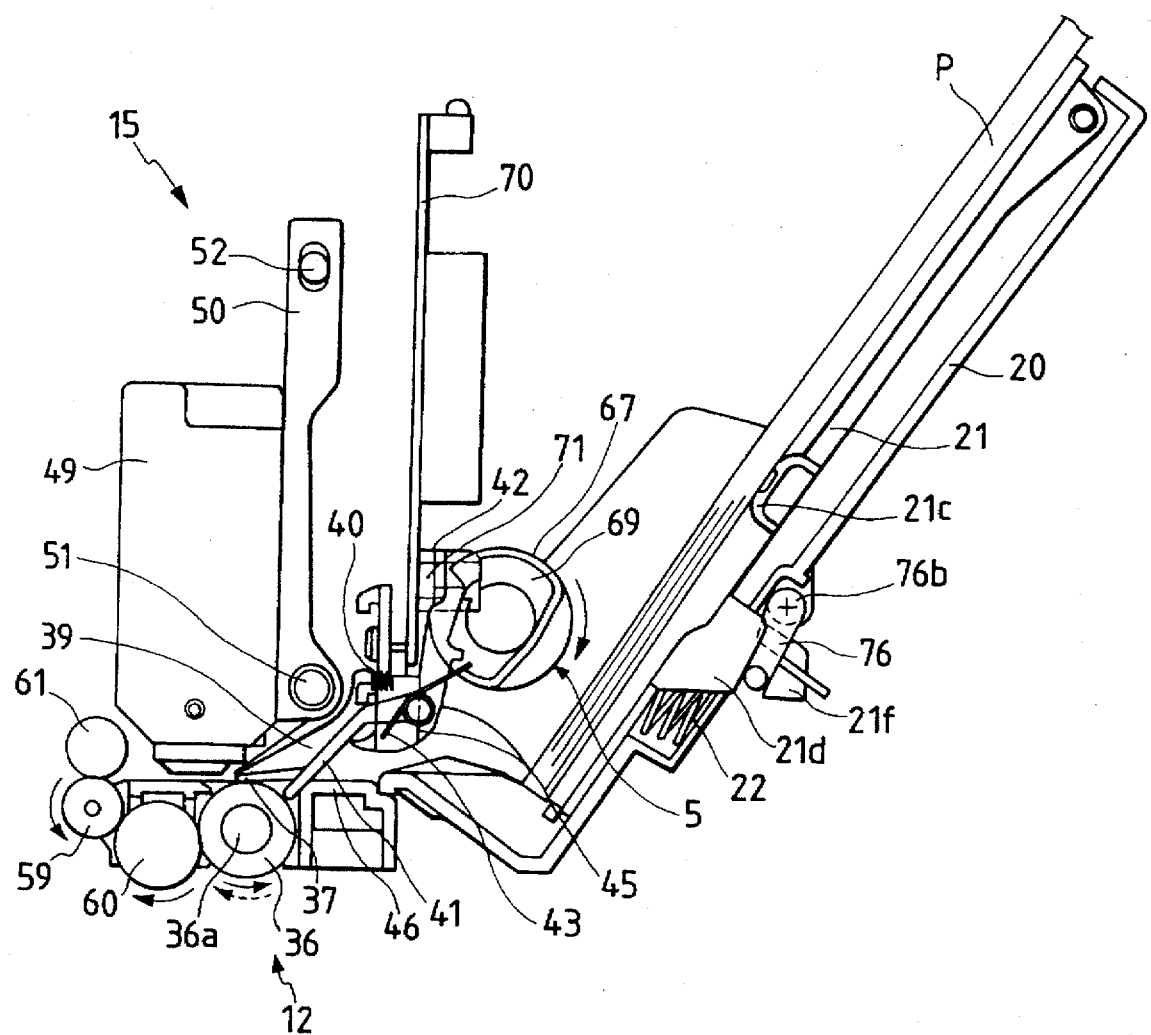
FIG. 2 is an elevational sectional view of the recording apparatus of FIG. 1.

As shown in FIG. 2, the sheet feeding portion 12 comprises the convey roller 36, a pinch roller 37, a pinch roller guide 39, a pinch roller spring 40, a PE sensor lever 41, a PE sensor 42, a PE sensor spring 43, an upper guide 45 and a platen 46. The sheet P sent to the sheet feeding portion 12 is guided by the platen 46, pinch roller guide 39 and upper guide 45 to reach a nip between the convey roller 36 and the pinch roller 37. The PE sensor lever 41 biased to a predetermined position by the pinch roller spring 40 is disposed in front of the nip between the convey roller 36 and the pinch roller 37, so that a leading end of the sheet P can be detected to determine a recording position on the sheet P. The pinch roller 37 is urged against the convey roller 36 by biasing the pinch roller guide 39 by means of the pinch roller spring 40, thereby creating a conveying force for the sheet P.

The sheet P fed out from the sheet supply portion 11 is advanced along and on the platen 46 by rotating the paired rollers 36, 37 by means of an LF motor 47; meanwhile, an image is recorded on the sheet by a recording head 49 in response to predetermined image information. The recording head 49 is formed integrally with an ink tank to provide an easily interchangeable ink jet recording head. The recording head 49 is provided with electro-thermal converters so that the recording is effected by discharging ink from discharge openings by utilizing the pressure change generated by growth and contraction of bubbles caused by thermal energy applied to the electro-thermal converters.

As shown in FIGS. 1 and 2, a recording portion 15 comprises a carriage 50 on which the recording head 49 is mounted, a guide shaft 51 along which the carriage 50 is reciprocally shifted in a direction perpendicular to a feeding direction of the sheet P, a guide 52 for holding a rear end of the carriage 50 to maintain a gap between the recording head and the sheet, a timing belt 55 for transmitting a driving force of a carriage motor 53 to the carriage 50, idle pulleys 56 for tensioning the timing belt 55, and a flexible cable or substrate 57 for transmitting a head drive signal from an electric substrate to the recording head 49. By scanning the recording head 49 and the carriage 50 together, the image is formed on the sheet P conveyed on the platen 46.

A sheet discharge portion comprises sheet discharge rollers 59, transmission rollers 60 for transmitting the driving force of the convey roller 36 to the discharge rollers 59, spurs 61 for aiding the sheet discharge, and a sheet discharge tray 62. The sheet P is discharged onto the tray 62 by the discharge rollers 59 and the spurs 61 without distorting the image on the sheet.

A cleaning portion 16 comprises a pump 63 for cleaning the recording head 49, a cap 65 for preventing the drying of the recording head 49, and a drive switching lever 66 for switching the drive from the convey roller 36 between the sheet supply portion 11 and the pump 63. Other than the sheet supplying operation and the cleaning operation, the drive switching lever 66 is positioned as shown in FIG. 1 so that a planetary gear (described later) rotated around a roller shaft of the convey roller 36 is fixed at a predetermined position, thereby not transmitting the driving force of the convey roller 36 to the pump 63 and the sheet supply portion 11.

When the drive switching lever 66 is moved in a direction shown by the arrow A by shifting the carriage 50, the planetary gear is shifted in accordance with the normal rotation and reverse rotation of the convey roller 36, with the result that the driving force of the convey roller 36 is transmitted to the sheet supply portion 11 upon the normal rotation of the convey roller 36 and is transmitted to the pump 63 upon the reverse rotation of the convey roller. Further, the LF motor 47 for driving the convey roller 36 and the carriage motor 53 for driving the carriage 50 are stepping motors rotated at predetermined angles in response to signals sent from drivers (not shown).

Figure 6:
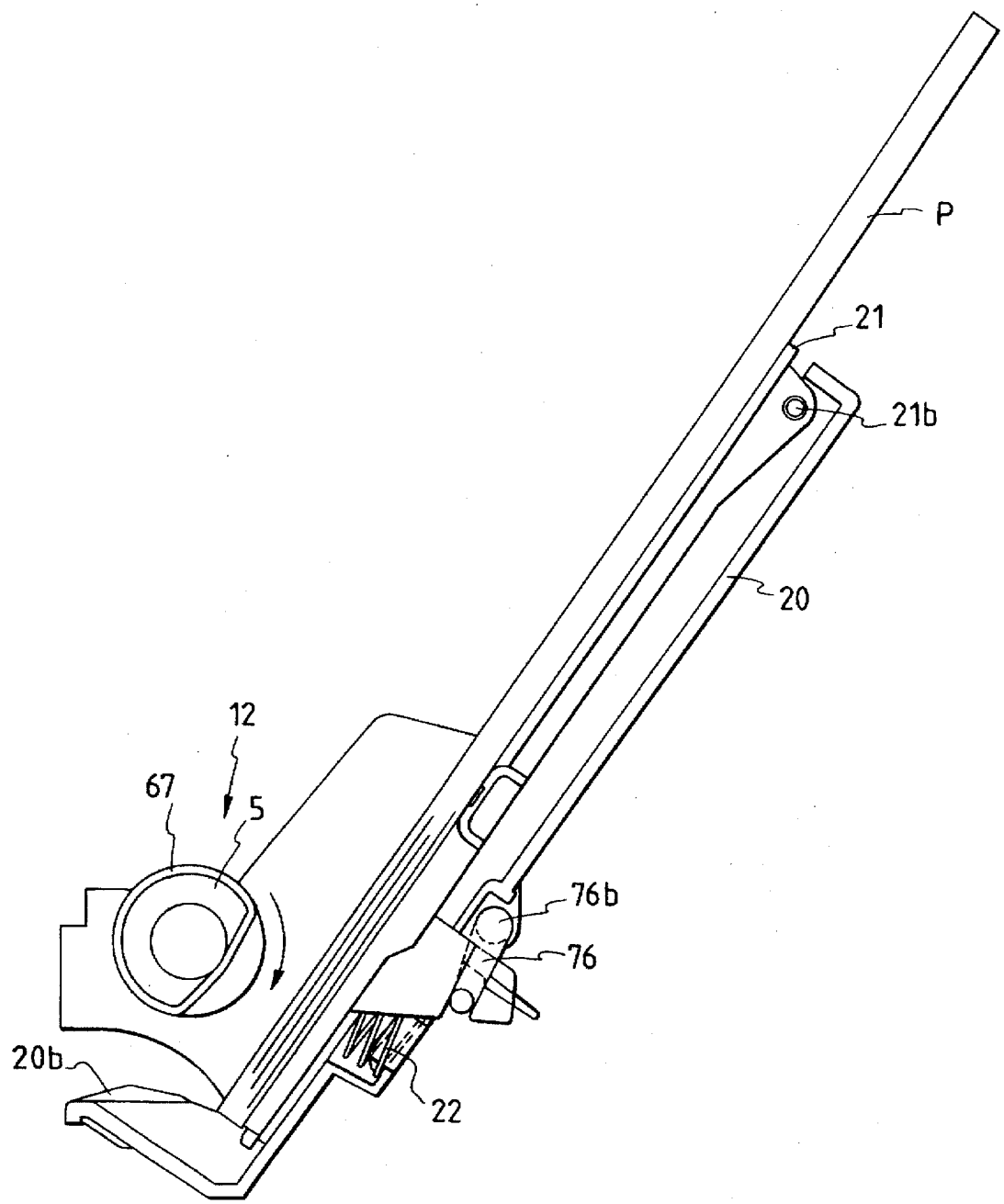
FIG. 6 is an elevational sectional view showing a condition that sheets rested on a pressure plate are spaced apart from a sheet supply roller in the sheet supplying apparatus of FIG. 1.
Figure 7:
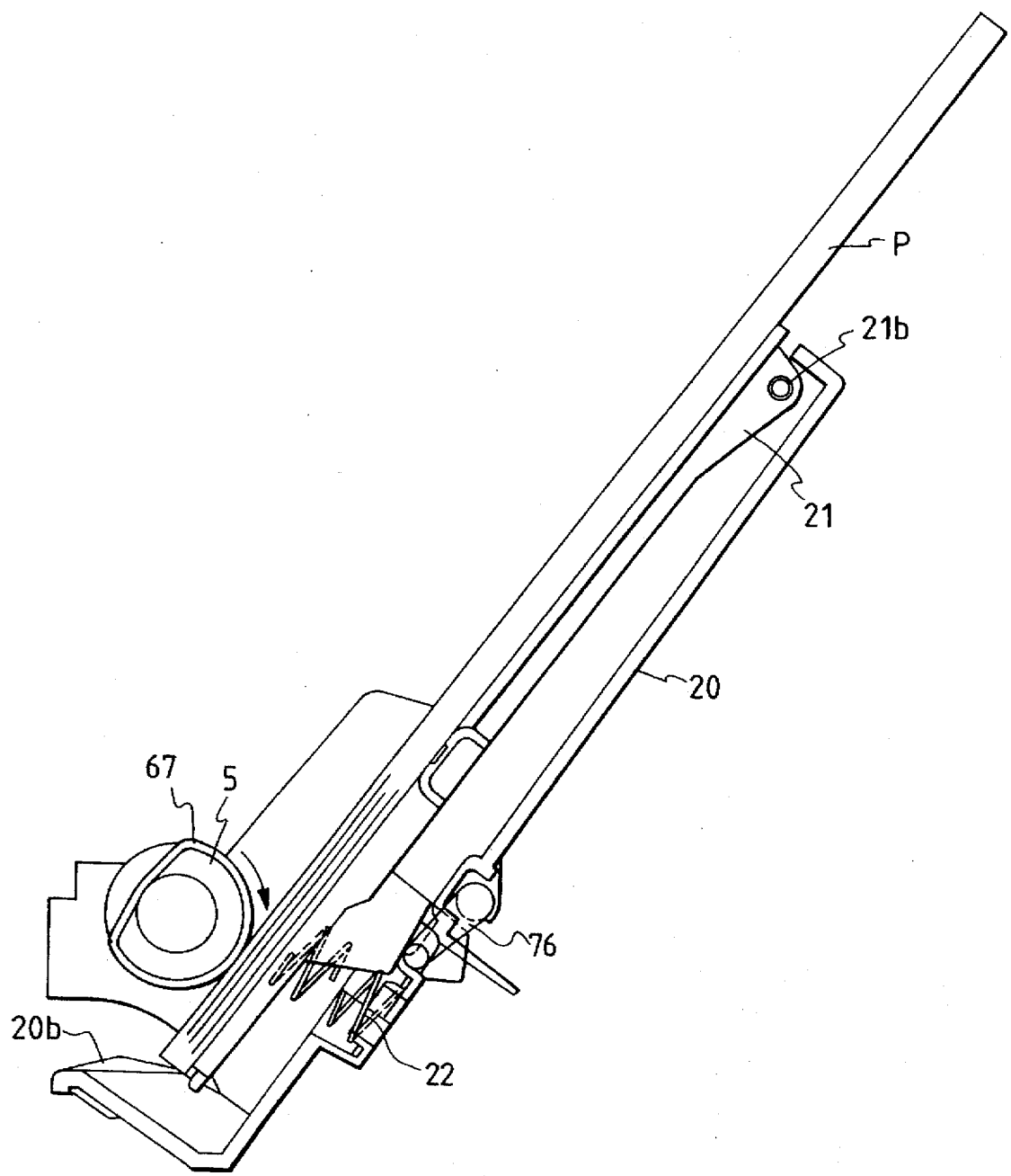
FIG. 7 is an elevational sectional view showing a condition that the sheets rested on the pressure plate are urged against the sheet supply roller in the sheet supplying apparatus of FIG. 1.

As shown in FIG. 2, the sheet supply roller 5 has a sensor plate 69 having a diameter smaller than that of the sheet supply roller rubber 67 of the sheet supply roller. The sensor plate 69 has a notch so that, only when the sheet supply roller 5 and the release cam 31 are in an initial position where the pressure plate 21 is released as shown in FIG. 6, a roller sensor 71 comprising a photo-interrupter directly provided on an electric substrate 70 is not blocked, thus establishing the light passing condition. By detecting the condition of the sensor plates 69, an angular position of the sheet supply roller 5 and an angular position of the release cam 31 driven in phase with the sheet supply roller 5 can be detected, thereby obtaining the timing of the control of a sheet supply sequence for the sheet P.

Next, main elements of the sheet supply portion 11 will be fully explained.

Figure 3:
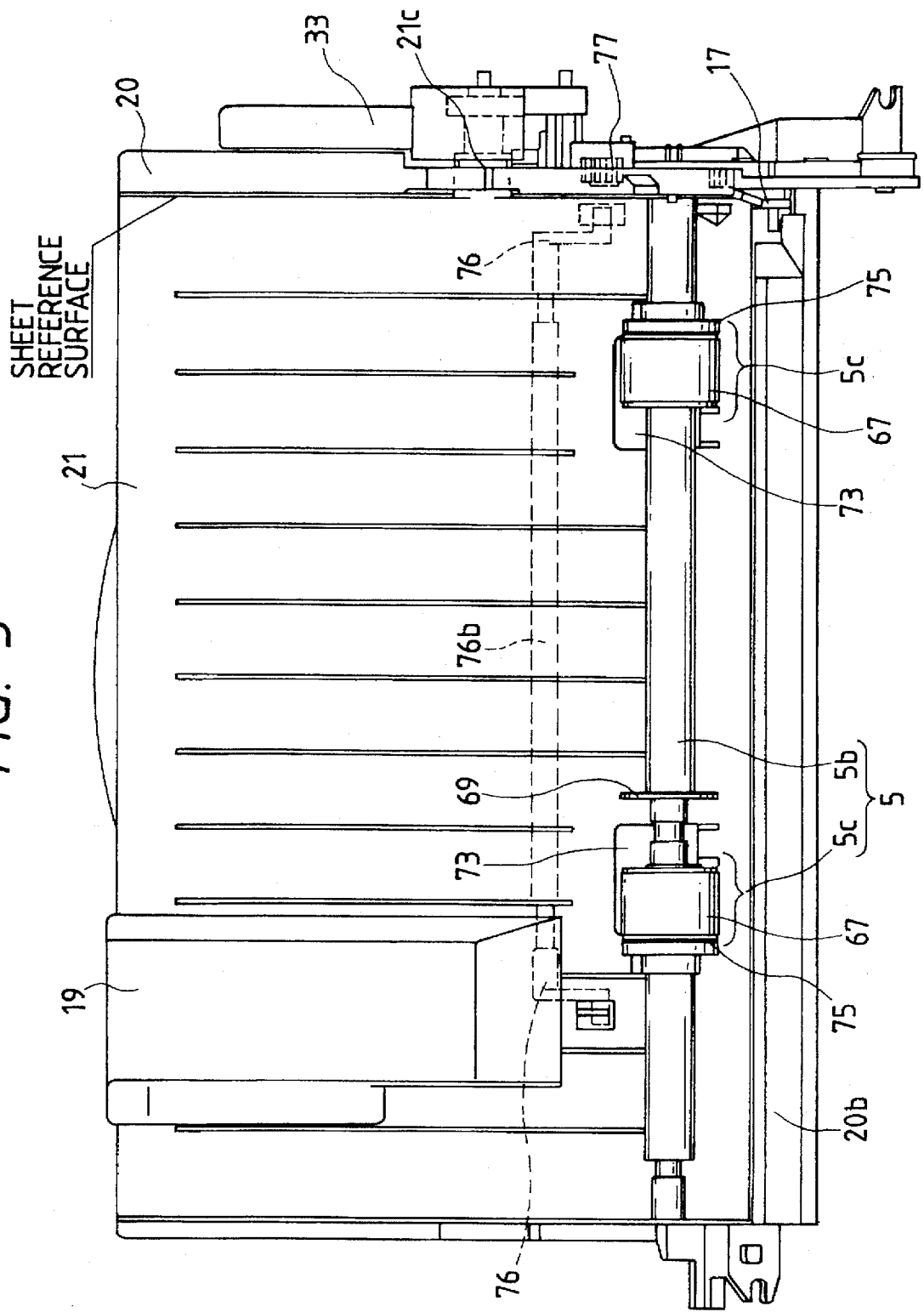
FIG. 3 is a plan view of the sheet supplying apparatus of FIG. 1.

As shown in FIG. 3, the sheet supply portion 11 is constituted as a unit wherein various elements of the sheet supply portion are mounted on the base 20. The sheet supply portion 11 is of one side reference type wherein the sheets P are set by utilizing a left side plate of the base 20 as a reference. The base 20 has a recessed portion into which the pressure plate 21 is retracted as shown in FIG. 6 and in which the pressure plate springs 22 are positioned in a confronting relation to roller portions 5c of the sheet supply roller 5.

The pressure plate 21 is connected to the base 20 via pressure plate pins 21b formed on both upper sides of the plate so that the pressure plate can be rotated around the pins 21b. Separation pads 73 made to material having relatively high coefficient of friction such as artificial leather are arranged on the pressure plate 21 at positions confronting to the sheet supply roller portions, thereby preventing the double-feed of the sheets when the number of sheets is decreased. Further, the movable side guide 19 can be slid to the left and right on the pressure plate 21 so that any sheets P having different sizes can easily be set against the sheet reference.

Both ends of the sheet supply roller 5 are rotatably supported by the base 20. The sheet supply roller 5 is a one piece molded part comprising a shaft portion 5b and roller portions 5c, and the sheet supply roller rubbers 67 are arranged around the roller portions 5c. Each roller portion has a semi-circular configuration. Further, auxiliary rollers 75 each having a diameter smaller than that of the sheet supply roller rubber 67 of the sheet supply roller 5 by 0.5 to 3 mm are arranged on outer sides of the roller portions 5c so that the deterioration of the image and the out-of-position of the roller portions 5c can be prevented by preventing the contact between the sheet and the roller rubbers 67 other than the sheet supplying operation.

Further, there are two roller portions 5c, and these roller portions are fixed on the shaft portion 5b and are spaced apart from the sheet reference by about 40 mm and 170 mm, respectively. Thus, a sheet of A4 size is conveyed by two roller portions 5c, and a post card is conveyed by the single roller portion 5c near the sheet reference.

When the convey roller 36 is rotated normally by shifting the drive switching lever 66 of the cleaning portion 16 in the direction A by the carriage 50, the planetary gear (not shown) is shifted to engage with an input gear 25, thereby transmitting the driving force to the sheet supply portion. The input gear 25 transmits the driving force to a sheet supply roller gear 28 connected to the sheet supply roller 5, via idler gears 26, 27, with the result that the sheet supply roller 5 is rotated, thereby conveying the sheet P.

Further, the sheet supply roller gear 28 transmits the driving force to the release cam 31 via a clutch gear 29 and an idler gear 30. In this case, the sheet supply roller 5 is in phase with the release cam 31 for each revolution so that, in the condition that the pressure plate 21 is released as shown in FIG. 6, cut-out portions of the semi-circular roller portions 5c of the sheet supply roller 5 are opposed to the pressure plate 21.

The release cam 31 is so shaped that it can release the pressure plate 21 only through 120 degrees of the cut-out portion, so that, when the cylindrical portions of the roller portions of the sheet supply roller 5 are opposed to the pressure plate 21, the release cam is contacted with the sheet P or the pressure plate 21 with a pressure of 200 to 500 grams without fail. Further, the release cam 31 releases the pressure plate 21 by depressing a hold-down portion 21c of the pressure plate 21 protruded from a hole formed in the right side plate of the base 20. In this case, a pressure plate cam 76 attached to the base 20 is lowered by a cam 21d arranged near the hold-down portion 21c of the pressure plate 21, thereby rotating the pressure plate cam 76 around a center 76b. A cam 21f arranged at an outer side of the left roller portion 5c is lowered by the pressure plate cam 76. In this way, even when the hold-down portion 21c arranged at the end of the pressure plate 21 is lowered, the pressure plate 21 is not inclined with respect to the base 20 to be maintained substantially horizontally.

A clutch spring 77 (FIG. 1) is arranged within the clutch gear 29 so that, when the gear is rotated in a direction shown by the arrow B in FIG. 4, the clutch spring is tightened, thereby preventing the reverse rotation of the gear. Thus, since the sheet supply roller 5 is not rotated by the resiliency of the sheet P during the registration, it is possible to effect the good registration.

The separating claw 17 can be rotated around a center 17b and is normally urged against the sheet P or the pressure plate 21 with a force of 20 to 100 grams. The separating claw 17 serves to separate so-called normal sheets, and is disposed in the proximity of the convey reference as shown in FIG. 3. The separating claw has a triangular configuration covering a corner of the sheet P. When the sheets P are subjected to the resistance from the triangular portion of the separating claw 17, they can be separated one by one. Thick sheets other than the normal sheet can be separated one by one by abutting the sheet against a lower guide portion 20b (FIG. 6) of the base 20 without catching the sheet P by the separating claw 17.

The release lever 33 and the releasing cam 35 (FIG. 4) are positioned on an axis coaxial with the release cam 31 (FIG. 5). The release lever 33 and the releasing cam 35 are not synchronously operated with the release cam 31 and are operated independently by an operator to set the sheets P. The release lever 33 and the releasing cam 35 are connected to each other via a gear.

The release lever 33 has three positions, i.e., (1) feed position, (2) thick sheet set position, and (3) normal sheet set position, which positions are spaced apart from each other by an angle of 20 to 50 degrees. A gear ratio is selected so that the releasing cam 35 is rotated by 90 degrees, respectively, in correspondence to these three positions of the release lever 33.

In the feed position, the releasing cam 35 does not act on the hold-down portion 21c of the pressure plate 21 and a hold-down portion 17c of the separating claw 17. During the normal sheet supply, this position is established.

In the thick sheet set position, since the releasing cam 35 depresses only the hold-down portion 21c of the pressure plate 21, the separating claw 17 is lowered along the pressure plate 21, with the result that the thick sheets can be set without being caught by the separating claw 17.

In the normal sheet set position, since the releasing cam 35 depresses both the hold-down portion 21c of the pressure plate 21 and the hold-down portion 17c of the separating claw 17, the separating claw 17 is lifted with respect to the pressure plate 21, with the result that the normal sheets can be set with being caught by the separating claw 17.

Incidentally, the above-mentioned gears (excluding the sheet supply roller shaft 79), separating claw 17, release lever 33 and the releasing cam 35 are provided on a shaft supported by the right side plate of the base 20 so that they can be rotated around the shaft.

Next, the sheet supplying operation of the sheet supply portion 11 and the control therefor will be fully explained.

Figure 12:
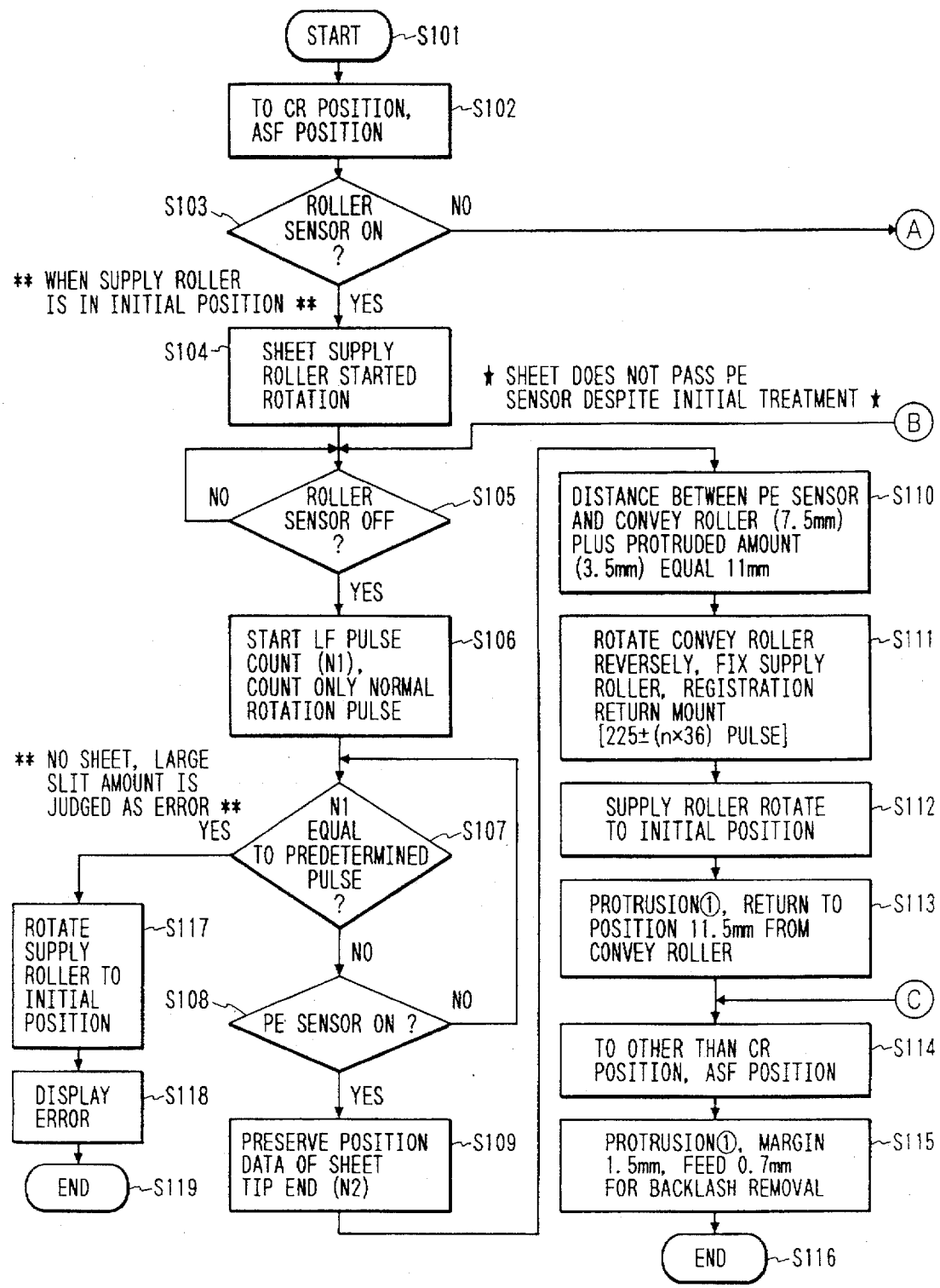
FIGS. 12 and 13 are flow charts showing the control according to the present invention.
Figure 13:
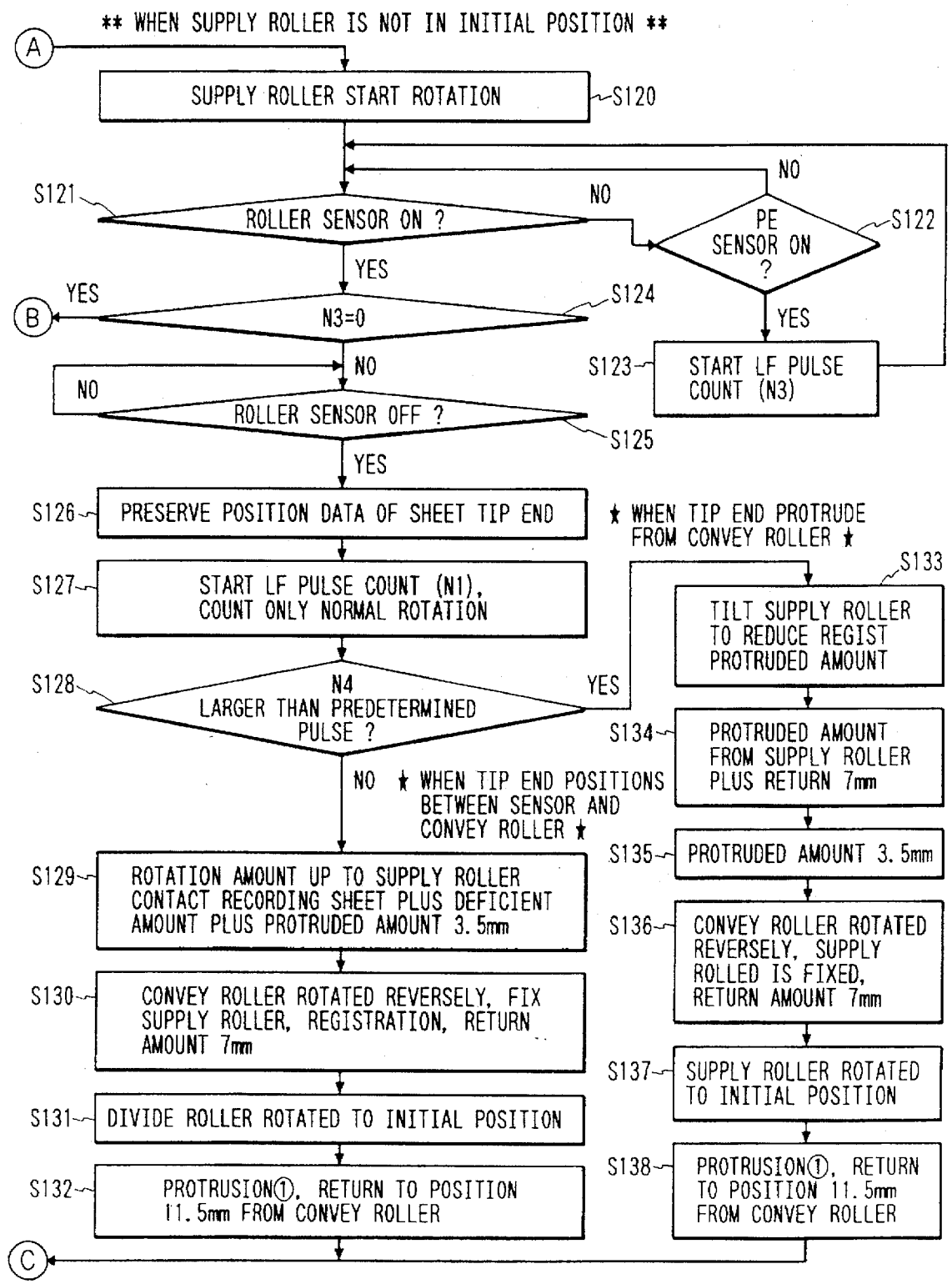

The whole control flow chart is shown in FIGS. 12 and 13, and the sheet supplying operation will be described with reference to FIGS. 14A to 14F. As shown, this control is broadly divided into a case where the sheet supply roller 5 is positioned in the predetermined initial position and a case where the sheet supply roller 5 is not positioned in the predetermined initial position. In this example, the control when the sheet supply roller 5 is positioned in the predetermined initial position will be described.

In a step S101 in FIG. 12, the control is started. In a step S102, the carriage 50 is shifted in response to a sheet supply start signal, thereby shifting the drive switching lever 66, with the result that the transmission of the driving force of the convey roller 36 to the sheet supply portion (ASF position) is permitted.

Then, in a step S103, the condition of the roller sensor 71 for detecting the initial position of the sheet supply roller 5 is judged; if the sheet supply roller 5 is positioned in the initial position, the program goes to a step S104, whereas if not, the program goes to a step S120. When the sheet supply roller 5 is positioned in the initial position, the sheet supply roller 5 is rotated in the step S104, and, in steps S105 and S106, by counting (N1) of the number of drive pulses of the LF motor 47 after the detection of the notch of the sensor plate 69, the angular position of the sheet supply roller 5 is controlled correctly, thereby obtaining the high accurate control.

Figure 14A:
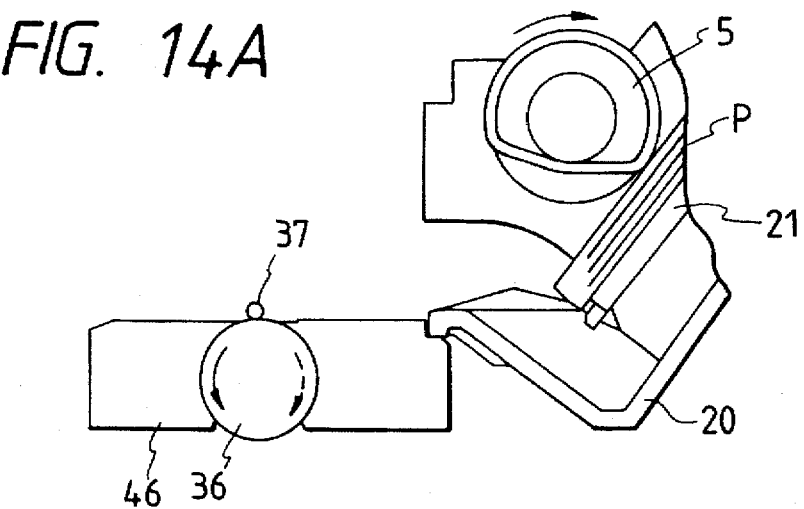
FIGS. 14A to 14F are views showing the operations of the sheet supply roller and the convey roller.

When the sheet supply roller 5 is rotated by about 60 degrees to confront the cylindrical portions of the semi-circular roller portions to the sheet P, the pressure plate 21 is released synchronously with the sheet supply roller 5 with the result that the sheet supply roller rubbers 67 are urged against the sheet by the pressure plate springs 22, thereby creating the conveying force for the sheet (FIG. 14A).

In steps S107, S108, the tip end of the sheet P being conveyed is detected by the PE sensor 42. If the tip end of the sheet P is not detected by the PE sensor 42 even after the sheet supply roller 5 is rotated by a predetermined amount, since there is no sheet on the pressure plate 21 or the slip exceeds a predetermined level, the program goes to the step S117, where the sheet supply roller 5 is rotated up to the initial position and then is stopped there. Then, the error is displayed (step S118), and the program is ended (step S119).

When the PE sensor 42 is turned ON before the sheet supply roller 5 is rotated by the predetermined amount, a sheet tip end position data N2 is sought at an angular position of the sheet supply roller 5 where the PE sensor 42 is turned ON, and this data is stored (step S109). Then, in a step S110, the sheet P is conveyed to the nip between the convey roller 36 and the pinch roller 37, and the heading or protrusion for the registration is effected.

Figure 14B:
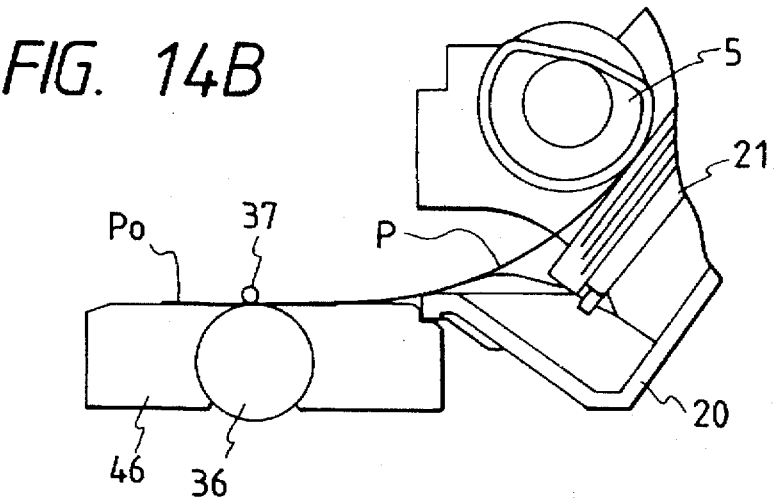

In the illustrated embodiment, since the recording sheet is conveyed by 7.5 mm (up to the nip between the convey roller 36 and the pinch roller 37) after the PE sensor 42 is turned ON and the protruded amount of 3.5 mm is required, the sheet is conveyed by 11 mm in total and then is stopped (FIG. 14B). In the step S111, the convey roller 36 is rotated reversely to leave the tip end of the sheet P from the nip between the convey roller 36 and the pinch rollers 37. To this end, the convey roller 36 is reversely rotated by the number of pulses of 225±(n×36) (n=1, 2, . . . ). The setting of the number of pulses will be described later.

Figure 14C:
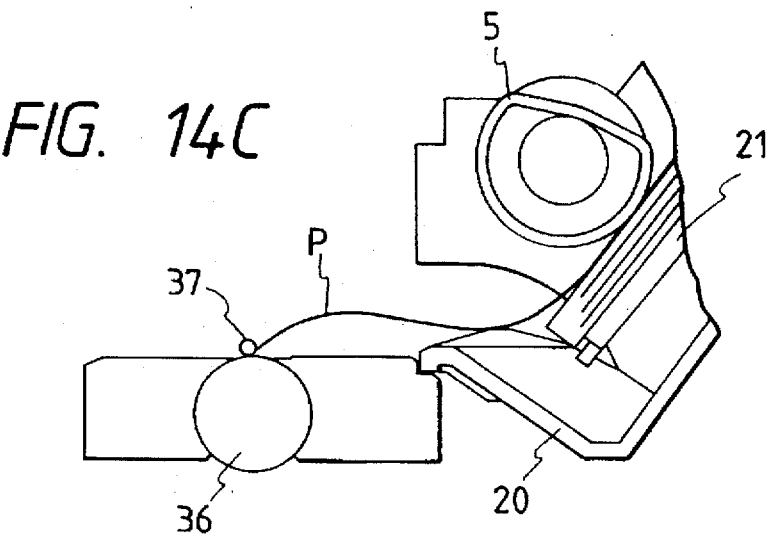

In this case, since the planetary gear (described later) for transmitting the driving force to the sheet supply roller 5 is separated from the input gear, the reverse driving force is not transmitted to the sheet supply roller 5. Further, since the sheet supply roller 5 is urged against the pressure plate 21 with the interposition of the sheets P, when the sheet P is fed back by the convey roller 36 for the registration of the sheet P, a force (by the resiliency of the sheet) for rotating the sheet supply roller 5 reversely acts on the sheet supply roller. However, due to the presence of the clutch gear 77, the clutch spring is tightened to fix the sheet supply roller 5, with the result that a loop is formed in the sheet P due to the resiliency of the sheet, thereby effecting the registration of the tip end of the sheet (FIG. 14C).

Figure 14D:
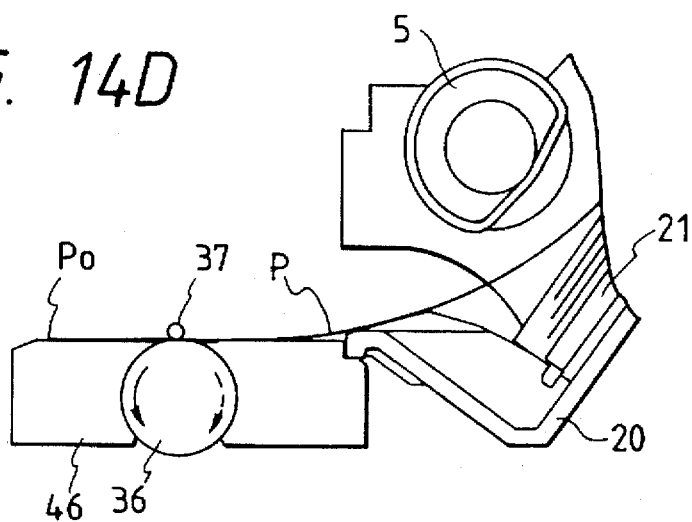
Figure 14E:
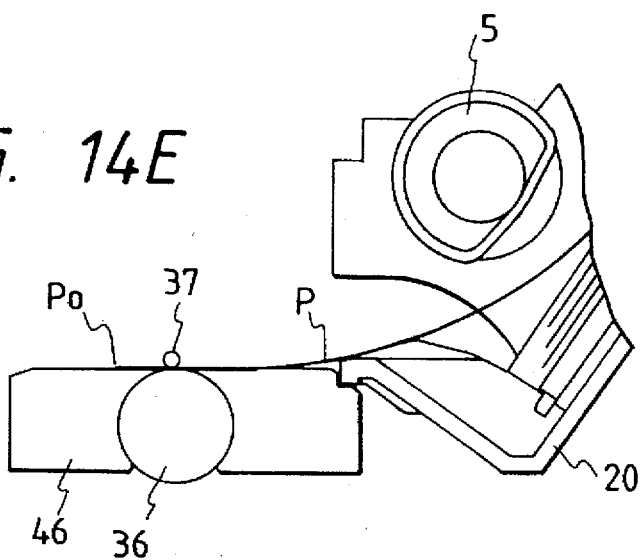
Figure 14F:
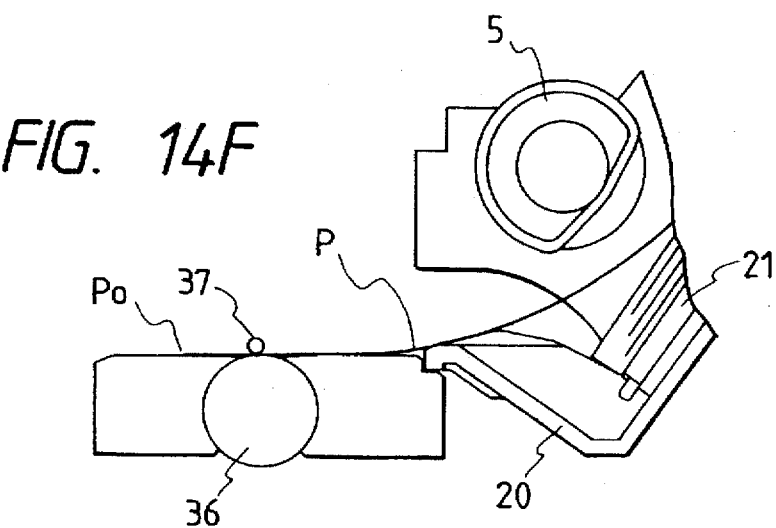

Then, in a step S112, the sheet supply roller 5 is rotated to the initial position where the cut-out portions of the semi-circular roller portions of the sheet supply roller are opposed to the sheet P. During this operation, the pressure plate 21 is lowered again, thereby regulating the pressure plate 21 (FIG. 14D). In this condition, the tip end of the sheet P is protruded from the nozzles of the recording head 49 by an amount greater than a predetermined margin of 1.5 mm. Accordingly, as shown in a step S113, in the illustrated embodiment, the sheet P is fed back by 11.5 mm position from the nip between the convey roller 36 and the pinch rollers 37 by rotating the convey roller 36 reversely (FIG. 14E). The returning amount can be calculated from the sheet tip end position data N2. In a step S114, the carriage 50 is shifted to shift the drive switching lever 66 so that the driving force of the convey roller 36 is not transmitted to the sheet supply portion. Then, in a step S115, the convey roller 36 is rotated normally to remove the backlash of gears, thereby feeding the sheet by 0.7 mm. In this way, the margin of 1.5 mm is obtained between the nozzles of the recording head 49 and the tip end of the sheet P (FIG. 14F).

Now, the above-mentioned planetary gear will be explained.

Figure 8:
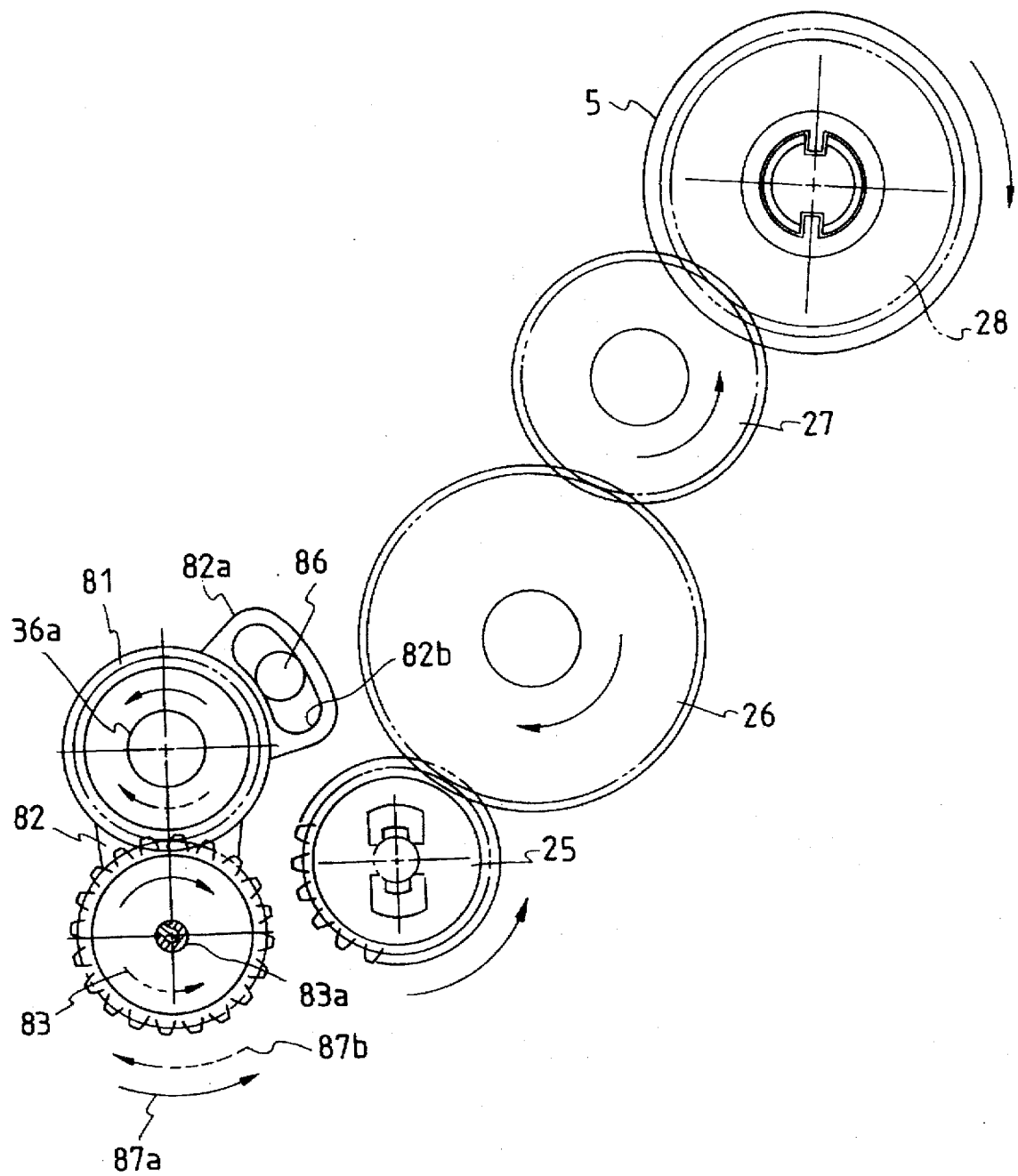
FIG. 8 is a front view of a gear switching portion between a convey roller and the sheet supply roller of the sheet supplying apparatus of FIG. 1.
Figure 9:
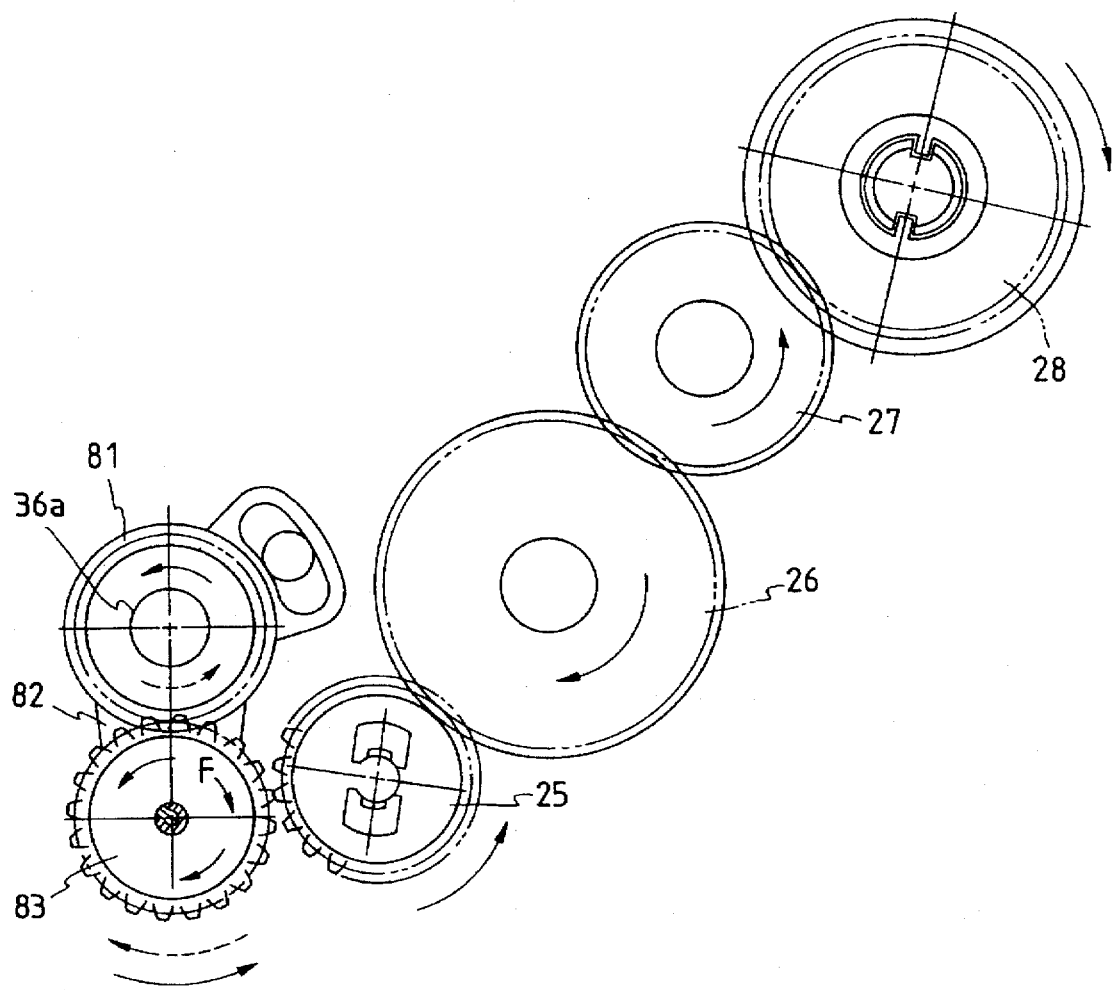
FIGS. 9 and 10 are views for explaining the operation of the gear switching portion shown in FIG. 8.
Figure 10:
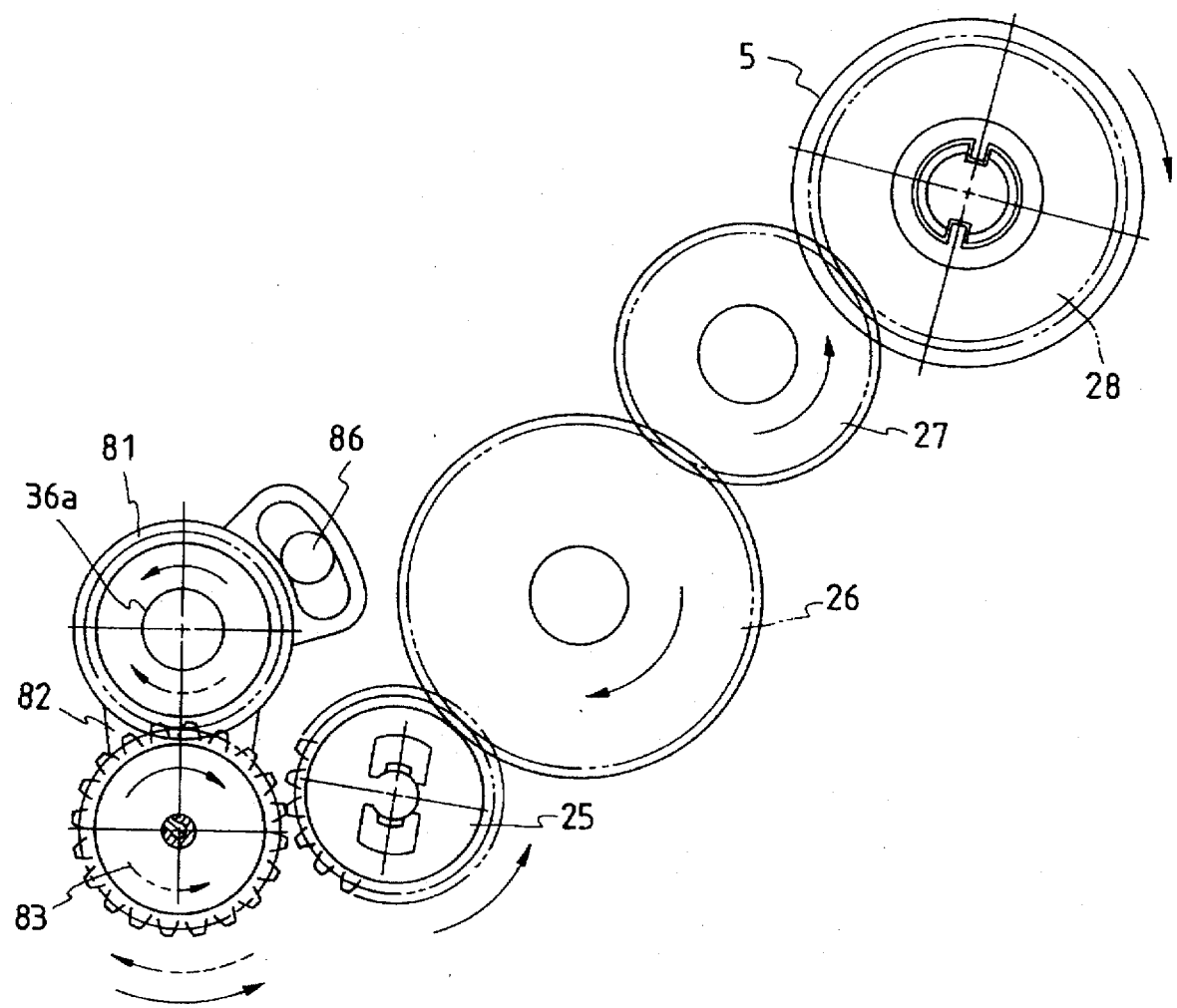

In FIGS. 8 to 10, a switching input gear 81 is secured to the convey roller 36 and can be rotated reversibly by the LF motor (refer to FIG. 1). A switching arm 82 includes a base portion rotatably mounted on a roller shaft 36a of the convey roller 36. A planetary gear or switching output gear 83 is rotatably mounted on a free end of the switching arm 82 and can be rotated by the rotation of the switching arm 82 to be engaged by the input gear 25 so that the normal rotation of the convey roller is transmitted to the input gear 25 and the sheet supply roller 5 driven in synchronous with the input gear. A control device 80 serves to control the rotations of the LF motor 47 and the convey roller 36 in a manner as mentioned later.

Figure 11:
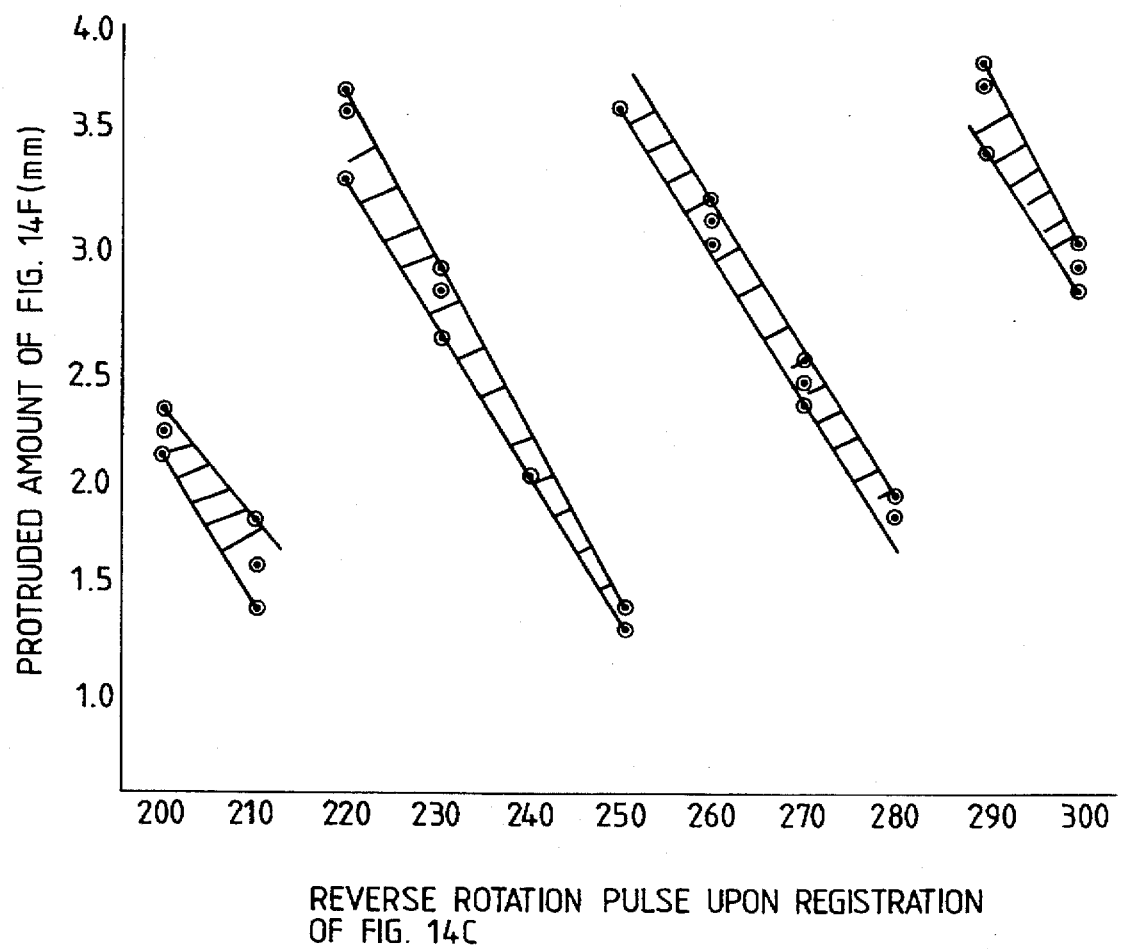
FIG. 11 is a graph showing the test data for explaining the rotation control of the convey roller.

FIG. 11 is a graph for effectively explaining the control of the rotation of the convey roller 36 in the sheet supplying apparatus according to the present invention.

In this graph, the abscissa denotes the number of reverse rotation pulses for reversely rotating the convey roller 36 from the condition shown in FIG. 14B to the registration condition shown in FIG. 14C, and the coordinate denotes the protruded amount shown in FIG. 14F when the control is effected on the basis of the number of reverse rotation pulses. Incidentally, the data shown in this graph concerns to the thick sheet for correctly explaining the slipping phenomenon caused on the convey roller 36 by holding the sheet by the sheet supply roller 5.

As apparent from FIG. 11, by changing the number of pulses upon the reverse rotation of the convey roller 36, the protruded amount of the sheet P is periodically changed in accordance with the number of pulses. That is to say, it can be seen that the slipping amount of the sheet P on the convey roller 36 is changed in accordance with the number of pulses upon the reverse rotation of the convey roller 36.

The mechanism in which the protruded amount of the sheet P is changed will now be explained with reference to FIGS. 8 to 10.

In the condition shown in FIG. 14C, i.e. when the registration of the sheet P is effected, the LF motor shown in FIG. 1 is rotated reversely, so that the switching input gear 81 secured to the roller shaft of the convey roller 36 is rotated in the direction shown by the broken arrow, i.e. the convey roller 36 is rotated in the reverse direction. In this case, the switching arm 82 rotatably mounted on the shaft 36a of the switching input gear 81 is also rotated in the same direction simultaneously. As a result, the switching output gear (planetary gear) 83 mounted on the free end of the switching arm 82 is rotated in a direction shown by the arrow 87b to be disengaged from the input gear 25, thereby interrupting the drive transmission.

When the convey roller 36 is rotated reversely to effect the registration of the sheet P, i.e. when the switching input gear 81 is rotated in the direction shown by the broken arrow, the switching arm 82 is prevented from rotating from the condition shown in FIG. 8 in the direction 87b by a spring clutch, with the result that the switching output gear 83 is rotated idly while maintaining the condition shown in FIG. 8.

After the reverse rotation of the convey roller by the predetermined number of pulses to effect the registration of the sheet is completed, the normal rotation of the convey roller 36 (in a direction shown by the solid line arrow) is effected. In this case, the switching arm 82 is rotated from the condition shown in FIG. 8 in the direction 87a. The switching output gear 83 is also shifted in the direction 87a while rotating in the direction shown by the solid line arrow so that the switching output gear is gradually approached to the input gear 25. When the switching output gear 83 the input gear 25, the rotational force of the switching output gear 83 is transmitted to the input gear 25, and further is transmitted to the sheet supply roller 5 via the idler gears 26, 27 and the sheet supply roller gear 28, thereby rotating the sheet supply roller 5 in a sheet supplying direction.

That is to say, while the switching output gear 83 is changed from the condition shown in FIG. 8 to the condition shown in FIG. 9, the sheet P is pulled out in a normal direction (toward the recording portion) by the convey roller 36. In this case, the sheet supply roller 5 is being stopped to hold the sheet P. If the time period in which the loop (FIG. 14C) in the sheet P is disappeared is greater than the time period in which the convey roller 36 is rotated while stopping the sheet supply roller 5, there is no slip of the sheet P on the convey roller 36 due to the holding of the sheet P by the sheet supply roller 5.

Next, the phase of each tooth of the switching output gear 83 shown in FIG. 10 is considered while considering the phase of each tooth of the switching output gear 83 shown in FIG. 9. In the condition of the switching output gear 83 shown in FIG. 9, immediately after the gears 83, 25 are engaged by each other, the rotational force of the switching output gear 83 is transmitted to the input gear 25; whereas, in the condition shown in FIG. 10, since the phase of the switching output gear 83 is not the phase that it can be engaged by the input gear 25, the switching output gear 83 must be rotated by an amount corresponding to a space between the adjacent teeth or less.

That is to say, in the condition of the switching output gear 83 shown in FIG. 10, the time period in which only the convey roller 36 is rotated and the sheet supply roller 5 is stopped becomes longer. As a result, the influence of the slip of the sheet P on the convey roller 36 due to the holding of the sheet P by the sheet supply roller 5 becomes greater.

The above-mentioned difference in condition can be obtained by changing the phase of the switching output gear 83 during the idle rotation of the switching output gear 83 in FIG. 8 by changing the number of pulses upon the reverse rotation of the convey roller 36 for the registration of the sheet. Further, since there is the difference in phase between the gears 83 and 25, the original condition can be restored by the number of pulses corresponding to one tooth of the gear. Incidentally, although the switching output gear 83 is engaged by the input gear 25 upon the normal rotation of the convey roller 36, since the switching arm 82 is rocked by a predetermined number of pulses upon the normal rotation to engage the gears 83, 25 with each other, even when the number of pulses upon the normal rotation is changed, the phase of the switching output gear 83 cannot be changed.

Regarding the number of pulses upon the reverse rotation of the convey roller 36 as shown in FIG. 11, thirty-six (36) pulses correspond to one tooth of the switching output gear 83, and a condition that the protruded amount of the sheet P is stabilized, i.e. a condition that the slip of the sheet P on the convey roller 36 is reduced can be established by this period.

In the step S111 of the flow chart shown in FIG. 12, the reverse rotation amount of the convey roller 36 corresponds to 225 pulses or therearound which makes the switching time shorter in accordance with FIG. 11, and further, the period of 36 pulses corresponding to one tooth of the switching output gear can be used.

In the illustrated embodiment, since the 36 pulses corresponding to one tooth of the switching output gear is used as the reverse rotation amount, the value of (36×n) can be used for the reverse rotation. Further, although the value of 225 pulses which can reduce the switching time is used, this value can be varied by the number of teeth of the switching output gear 83, the amount of the backlash of the gear, the range of the revolution of the switching output gear 83 around the shaft 36a and the like.

In this way, when the convey roller is rotated normally after the registration of the sheet by means of the convey roller and when the sheet supply roller is rotated after the driving force non-transmitting time is elapsed, since the number of pulses upon the reverse rotation of the convey roller is selected to minimize the driving force non-transmitting time, the driving force is transmitted to the sheet supply roller before the loop is disappeared upon the registration of the sheet, with the result that the slip of the sheet on the convey roller can be prevented, thereby permitting the supply of the sheet with the stable protruded amount of tip end of the sheet.

Incidentally, in the illustrated embodiment, while the optimum number of pulses upon the reverse rotation was sought from the test data, such number of pulses may be calculated so that the tooth of the gear 83 is in phase with the tooth of the gear 25 upon the engagement of the gears 25, 83.

Next, a second embodiment of the present invention will be explained with reference to the accompanying drawings.

Figure 15:
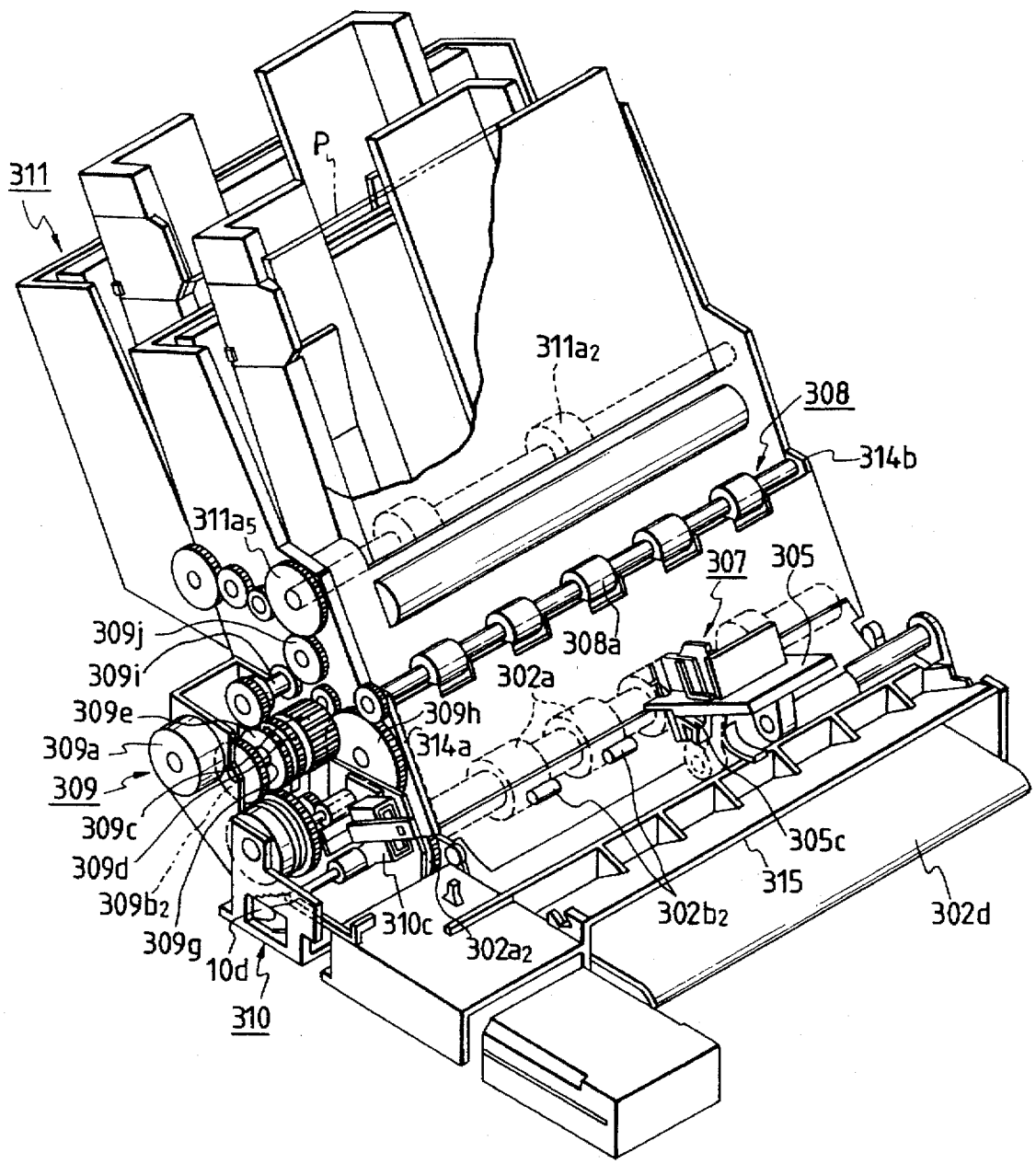
FIG. 15 is a perspective view of a recording apparatus including a sheet supplying apparatus according to a second embodiment of the present invention.
Figure 16:
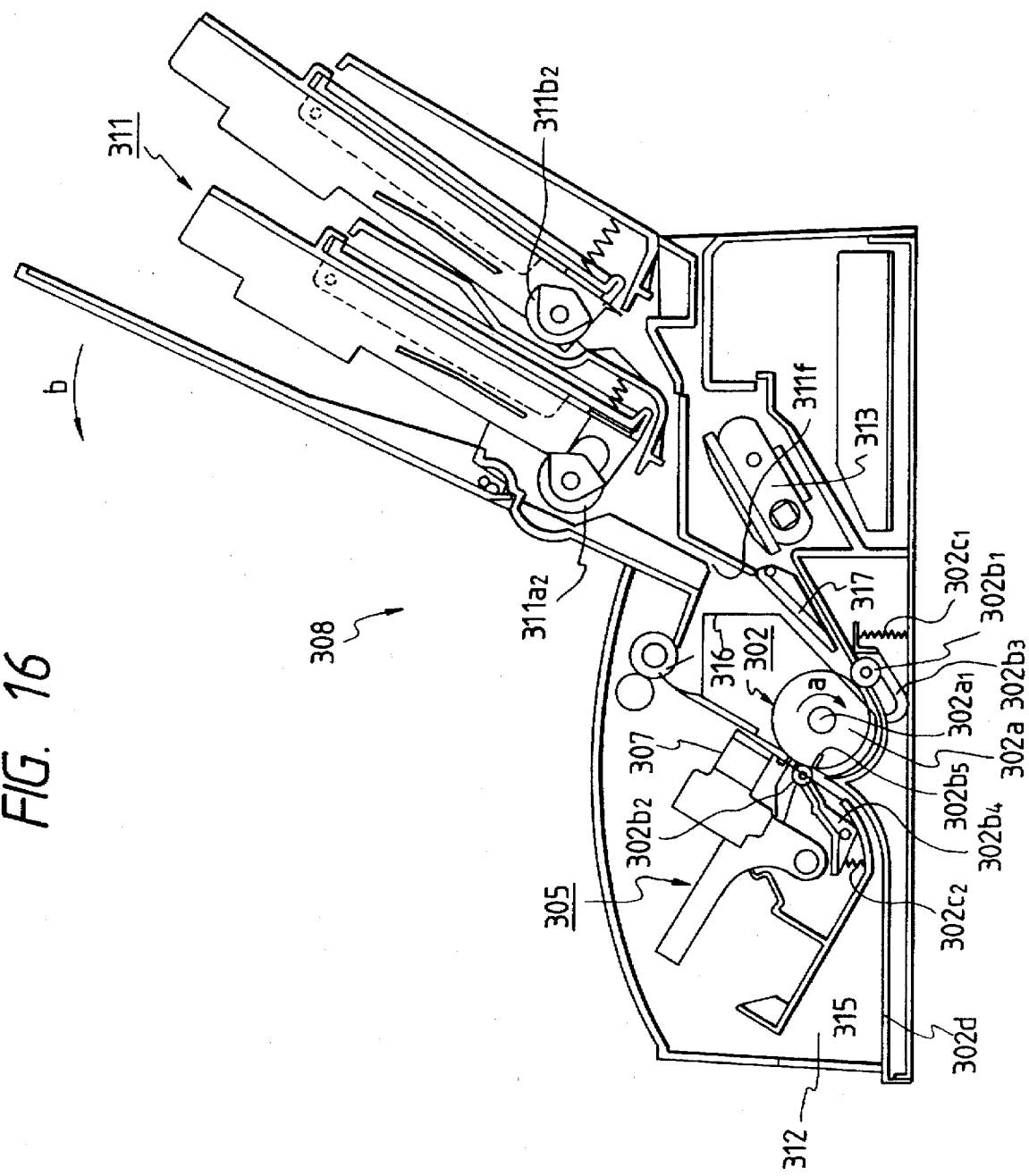
FIG. 16 is an elevational sectional view of the recording apparatus of FIG. 15.
Figure 17:
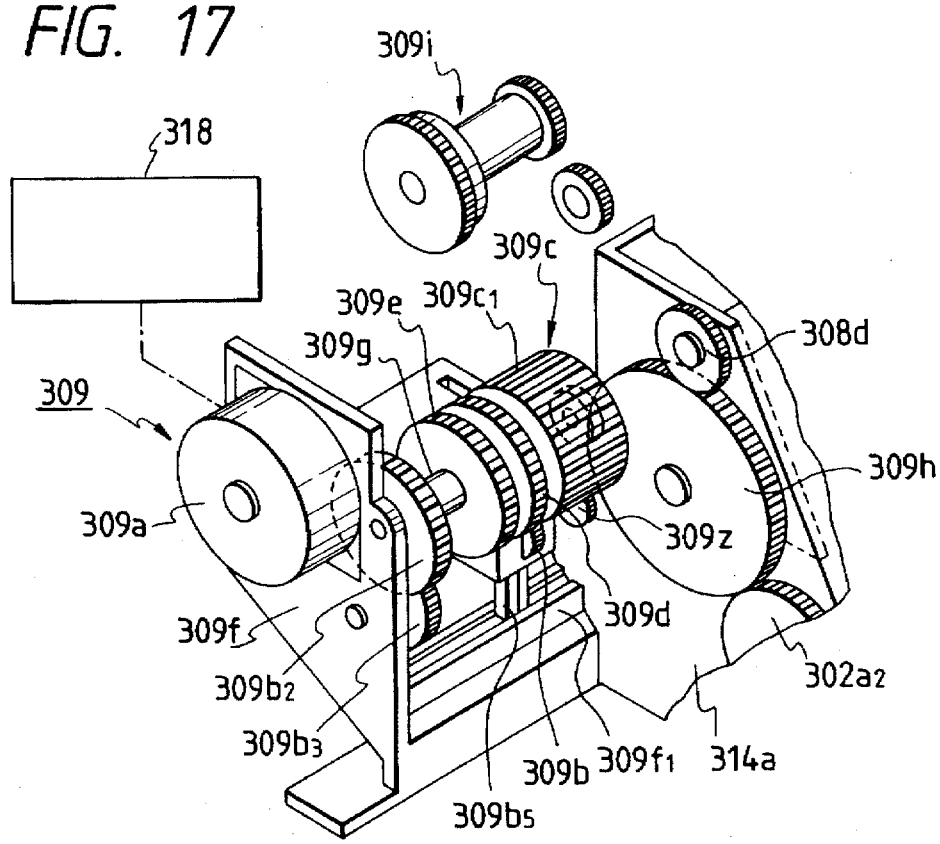
FIGS. 17 and 18 are perspective views of a switching device for switching gears in the sheet supplying apparatus of FIG. 15.
Figure 18:
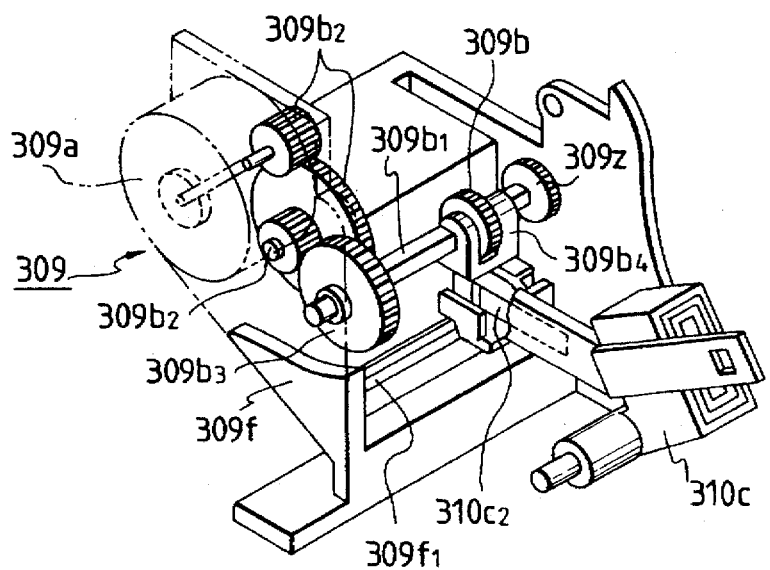

FIG. 15 is a perspective view of a recording apparatus according to the second embodiment, FIG. 16 is a sectional view of the recording apparatus, and FIGS. 17 and 18 are perspective views showing a main portion of a drive means of the recording apparatus.

A sheet convey means 302 serves to convey a sheet P to a recording position. The sheet may be a sheet supplied from an ASF (automatic sheet feeder) 311 removably mounted on the recording apparatus as shown in FIG. 16 or a sheet manually inserted through a manual insertion opening 312 or a fan-fold sheet supplied from a pin feed truck 313 for conveying the fan-fold sheet.

The convey means 302 is so designed that a convey roller 302a is rotated in a direction shown by the arrow a in FIG. 16 and the sheet P is conveyed by a pre-pinch roller $302b_1$ and a post-pinch roller $302b_2$ driven in synchronous with the convey roller. The convey roller 302a has a plurality of roller portions attached to a roller shaft $302a_1$ having both ends rotatably supported by left and right side walls 314a, 314b of a frame of the apparatus. A convey gear $302a_2$ is attached to one end of the roller shaft $302a_1$ so that a driving force from a drive motor 309a is transmitted to the convey gear.

The pinch rollers $302b_1$, $302b_2$ are supported by rockable pinch roller holders $302b_3$, $302b_4$, respectively, so that these rollers are urged against the surface of the convey roller 302a by springs $302c_1$, $302c_2$, respectively, and are driven in synchronous with the rotation of the convey roller 302a. Accordingly, the sheet P is pinched between the rotating convey roller 302a and the rotating pinch rollers $302b_1$, $302b_2$, thereby creating the conveying force.

Further, below the convey roller 302a, as shown in FIG. 16, there is arranged a paper pan 302d having a carvature along a peripheral surface of the convey roller 302a. Furthermore, upper guide plates 315, 316 with a predetermined distance therebetween are arranged above the paper pan 302d to provide a conveying path for the sheet P. A conveying path separation plate 317 is disposed between the paper pan 302d and the upper guide plate 316 so that the conveying path for the fan-fold sheet supplied from the truck 313 is separated from the conveying path for the sheet P supplied from the ASF 311.

As shown, a detection means comprising a sensor $302b_5$ of reflection type for detecting the sheets P conveyed along the corresponding conveying paths is arranged in the proximity of a nip between the convey roller 302a and the pinch roller $302b_2$.

With the arrangement as mentioned above, when the convey roller 302a is rotated in the direction a in FIG. 16 by driving the drive motor 309a, the sheet P supplied from the ASF 311 is passed through between the upper guide 316 and the conveying path separation plate 317 and is pinched between the pre-pinch roller $302b_1$ and the convey roller 302a, with the result that the sheet is conveyed in a U-turn path along the peripheral surface of the convey roller 302a. Further, the sheet is pinched between the post-pinch roller $302b_2$ and the convey roller 302a to be conveyed upwardly to the recording position.

As a recording means preferably used with this recording apparatus, for example, there is an ink jet recording means. The ink jet recording means comprises orifices (liquid discharge openings) for discharging recording ink as flying ink droplets, liquid passages communicating with the orifices, and discharge energy generating means disposed in the liquid passages and adapted to apply discharge energy to ink in the liquid passages to form the flying ink droplets. By selectively driving the discharge energy generating means in response to an image signals, the ink droplets are discharged, thereby forming an image on the sheet.

The discharge energy generating means may comprise, for example, a pressure energy generating means including an electro-mechanical converter such as a piezo element or an electromagnetic energy generating means for generating the flying droplet by applying an electromagnetic wave such as laser to the ink liquid. Among them, the thermal energy generating means is preferable in the point that the orifices can be arranged with high density and a recording head 307 can be made compact.

Next, the drive means according to the illustrated embodiment will be explained.

The drive means 309 is arranged rearwardly of a recovery device 310 and serves to transmit the driving force of the drive motor 309a to the aforementioned convey means 302, discharge means 308, ASF 311 and recovery device 310 and is constituted by the drive motor 309a and a gear transmission mechanism.

When a carriage 305 is shifted out of a recording permitting area of the recording apparatus at its one end, the gear transmission mechanism is switched by the carriage 305.

The carriage 305 is reciprocally shifted by transmitting a driving force of a carriage motor (drive source) 305a to the carriage via a transmitting means such as pulleys and a timing belt (not shown).

FIGS. 17 and 18 show the gear transmission mechanism in detail. The gear transmission mechanism comprises a drive gear 309b for transmitting the driving force of the drive motor 309a, an ASF output gear (transmission gear) 309d and a pump gear 309e capable of selectively engaging with the drive gear 309b, and a fixed drive gear 309z for transmitting the driving force of the drive motor 309a to a convey output gear 309c, similar to the drive gear 309b. The drive gear 309b is attached to a slide shaft $309b_1$ for shifting movement only in an axial direction. A gear $309b_3$ is secured to an end of the slide shaft $309b_1$, and the driving force of the drive motor 309a is transmitted to the gear $309b_3$ via an intermediate gear $309b_2$. Accordingly, when the drive motor 309a is operated, the drive gear 309b and the fixed drive gear 309z are rotated together with the slide shaft $309b_1$ by the gear $309b_3$.

Further, a slide holder $309b_4$, for holding the drive gear 309b is supported on the slide shaft $309b_1$ for sliding movement and rotational movement. A bifurcated projection $309b_5$ is formed on a lower portion of the slide holder $309b_4$ so that the projection $309b_5$ is engaged by a guide rail $309f_1$ of a frame 309f for supporting the gear transmission mechanism thereby to prevent the rotation and is also engaged by a free end of a connection spring $310c_2$ provided on a rear portion of a cap carriage 310c. Accordingly, when the carriage 305 is shifted to the left and right (FIG. 17) at one end of the recording apparatus, the slide holder $309b_4$ is shifted in the same direction via the cap carriage 310c. That is to say, the drive gear 309b is slid by the carriage 305, and the ASF output gear (transmission gear) 309d and the pump gear 309e have the same number of teeth and the same pitch circle diameter and are rotatably supported by a support shaft 309g provided on the frame 309f in parallel with the slide shaft $309b_1$.

The convey output gear 309c has a large diameter gear portion $309c_1$ meshed with the fixed drive gear 309z, and a small diameter gear portion $309c_2$ meshed with an intermediate gear 309h rotatably attached to the left side wall 314a. The intermediate gear 309h is meshed with the convey gear $302a_2$ fixed to one end of the convey roller 302a and a discharge gear 308d. When the drive gear 309b is engaged by the gear portion $309c_1$, as the drive motor 309a is operated, the convey roller 302a and the discharge roller 308a are rotated in the normal direction or the reverse direction.

Further, an ASF input gear 309i of the ASF 311 is meshed with the ASF output gear 309d so that, when the drive gear 309b is engaged by the ASF output gear 309d, the ASF input gear 309i is rotated in the normal direction or the reverse direction by the drive motor 309a. When the ASF output gear 309d is rotated in the normal direction by the drive motor 309a, the rotation is transmitted to the clutch gear $311a_5$ via the ASF input gear 309i and an intermediate gear 309j, thereby rotating the separation roller $311a_2$ in the normal direction to supply the sheet P from the ASF 311.

The supplied sheet P is passed through a sheet supply path 311f and then is pinched between the convey roller 302a and the pinch roller $302b_1$. After the sheet P is fed by a predetermined amount, the drive motor 309a is rotated reversely, thereby rotating the convey output gear 309c in the reverse direction. Consequently, the convey roller 302a is also rotated reversely, thereby feeding back the sheet P pinched between the convey roller 302a and the pinch roller $302b_1$. In this case, since the trailing end of the fed back sheet P is held by the separation roller $311a_2$, the sheet P is abutted against the nip between the rollers 302a, $302b_1$ while forming the loop in the sheet, thereby effecting the registration of the sheet P.

With this arrangement, in synchronous with the reverse rotation of the convey output gear 309c for effecting the registration, the carriage 305 is shifted to disengage the drive gear 309b from the ASF output gear 309d.

In the drive transmission effected by the gears, if the tip ends of the teeth of the gears are stopped without any back lash and there arises the residual stress due to the deflection of the gear shafts themselves, the gear shafts or the side plates supporting the gear shafts, when the gears try to be disengaged from each other in this condition, the great force is required. However, as mentioned above, when the drive gear 309b is disengaged from the ASF output gear 309d upon the reverse rotation of the drive motor 309a for effecting the registration of the sheet, the backlash can be created between the gears, thereby easily disengaging the gears from each other.

Figure 26:
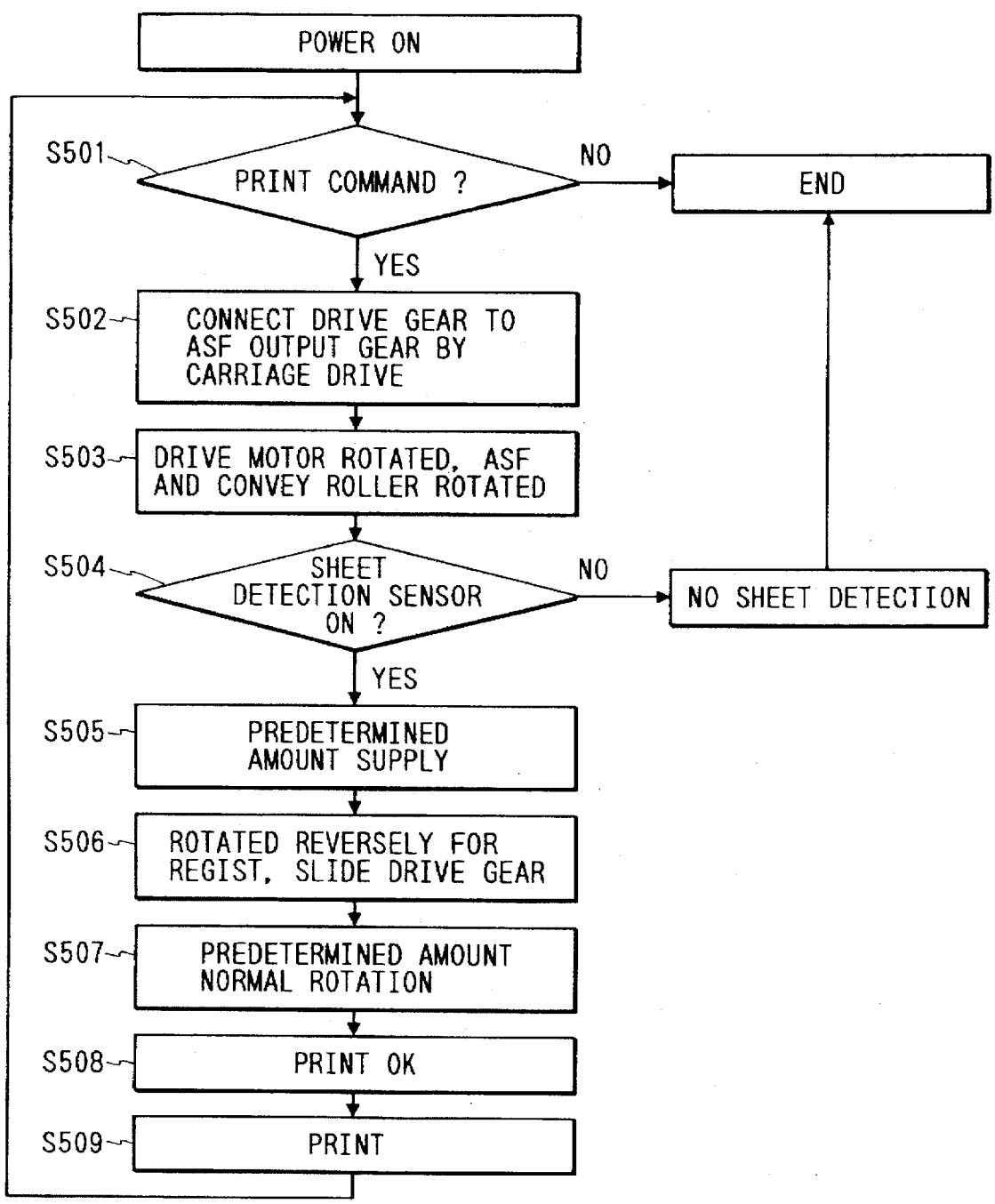
FIG. 26 is a flow chart for explaining the operation of the sheet supplying apparatus according to the second embodiment of the present invention.

Incidentally, such operation is shown in the flow chart of FIG. 26.

The control for this operation is effected by a control means 318 shown in FIG. 17, which will be explained hereinbelow.

After a power source is turned ON, it is judged whether a recording command is inputted or not in a step S501. If the recording command is inputted, in a step S502, the carriage 305 is driven and the drive gear 309b is connected to the ASF output gear 309d. In a step S503, the drive motor 309a is rotated to rotate the separation rollers $311a_2$, $311b_2$ of the ASF, and the convey roller 302a is also rotated to start the supply of the sheet P. In a step S504, the sheet P is detected by a sheet detection sensor $302b_5$. When the sheet P is detected, in a step S505, the convey roller 302a continues to rotate to pinch the sheet P between the convey roller 302a and the pinch roller $302b_1$ by a predetermined amount.

When a predetermined amount of the sheet P is pinched, the drive motor 309a is rotated reversely to effect the registration of the sheet, and at the same time, the drive gear 309b is lid by the carriage 305 to disengage the drive gear from the ASF output gear 309d. After the registration of the sheet is completed, the drive motor 309a is rotated normally again by a predetermined amount to effect the protrusion of the sheet P, thereby establishing the recording permitting condition in a step S508, and, in a step S509, the recording is effected.

In this way, since the gears are disengaged from each other by utilizing the reverse rotation of the drive motor 309a for effecting the registration, it is not required that the drive motor 309a is rotated merely to disengage the gears from each other as in the conventional case, thereby reducing the recording time.

Next, a third embodiment of the present invention will be explained.

Figure 19:
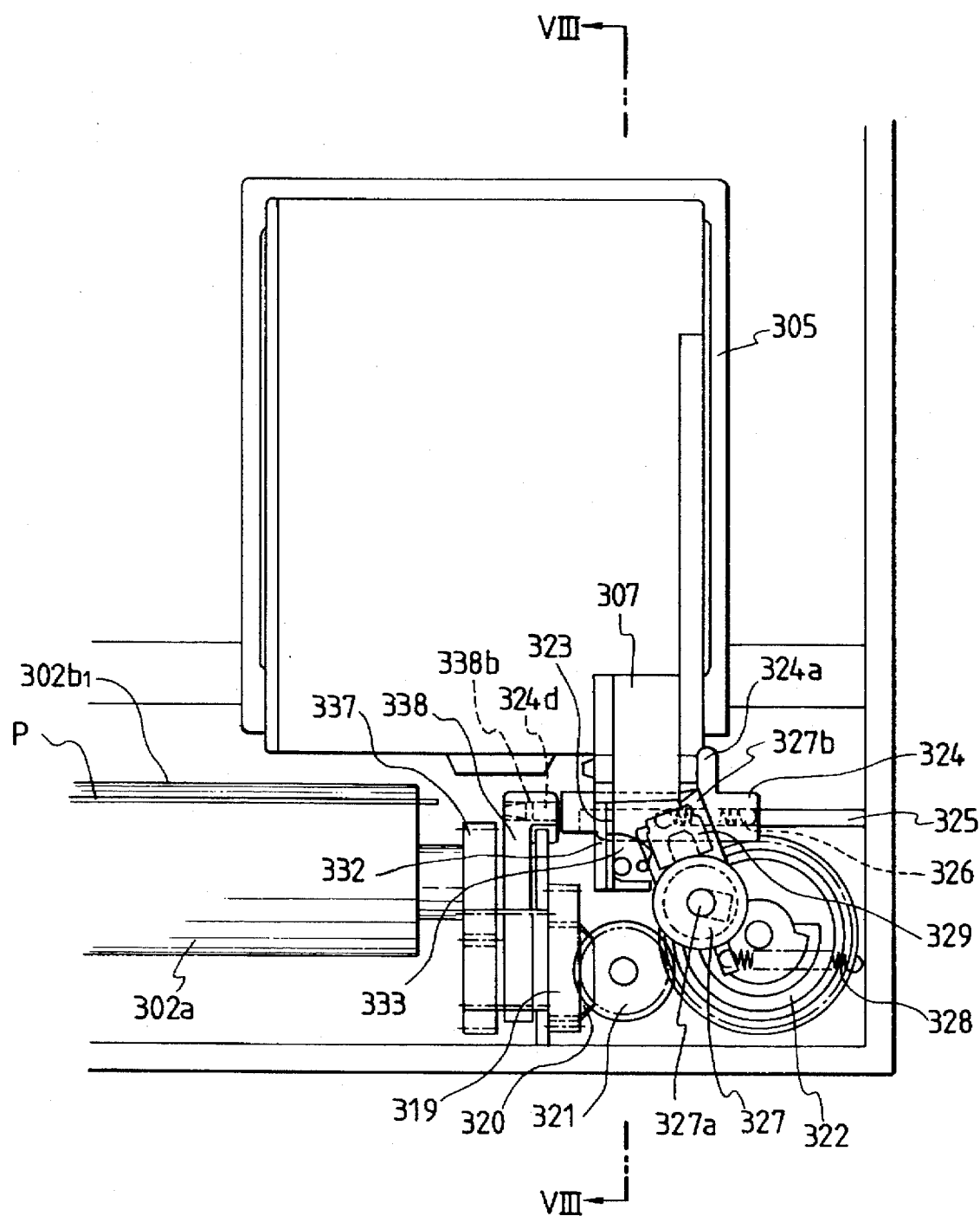
FIG. 19 is a front view of a switching device for switching gears in a sheet supplying apparatus according to a third embodiment of the present invention.
Figure 20:
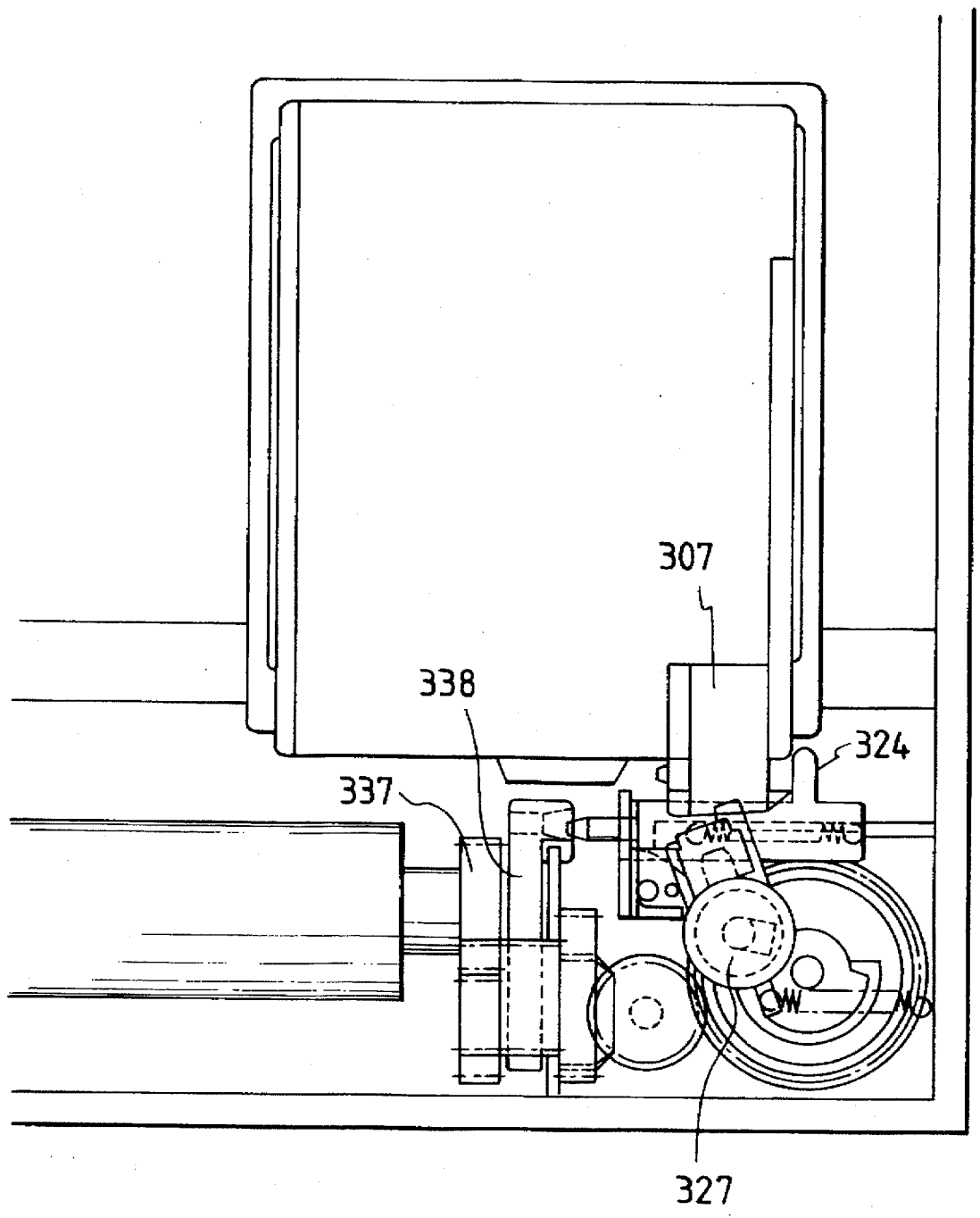
FIGS. 20 and 21 are front views showing the operation of the gear switching device of FIG. 19.
Figure 21:
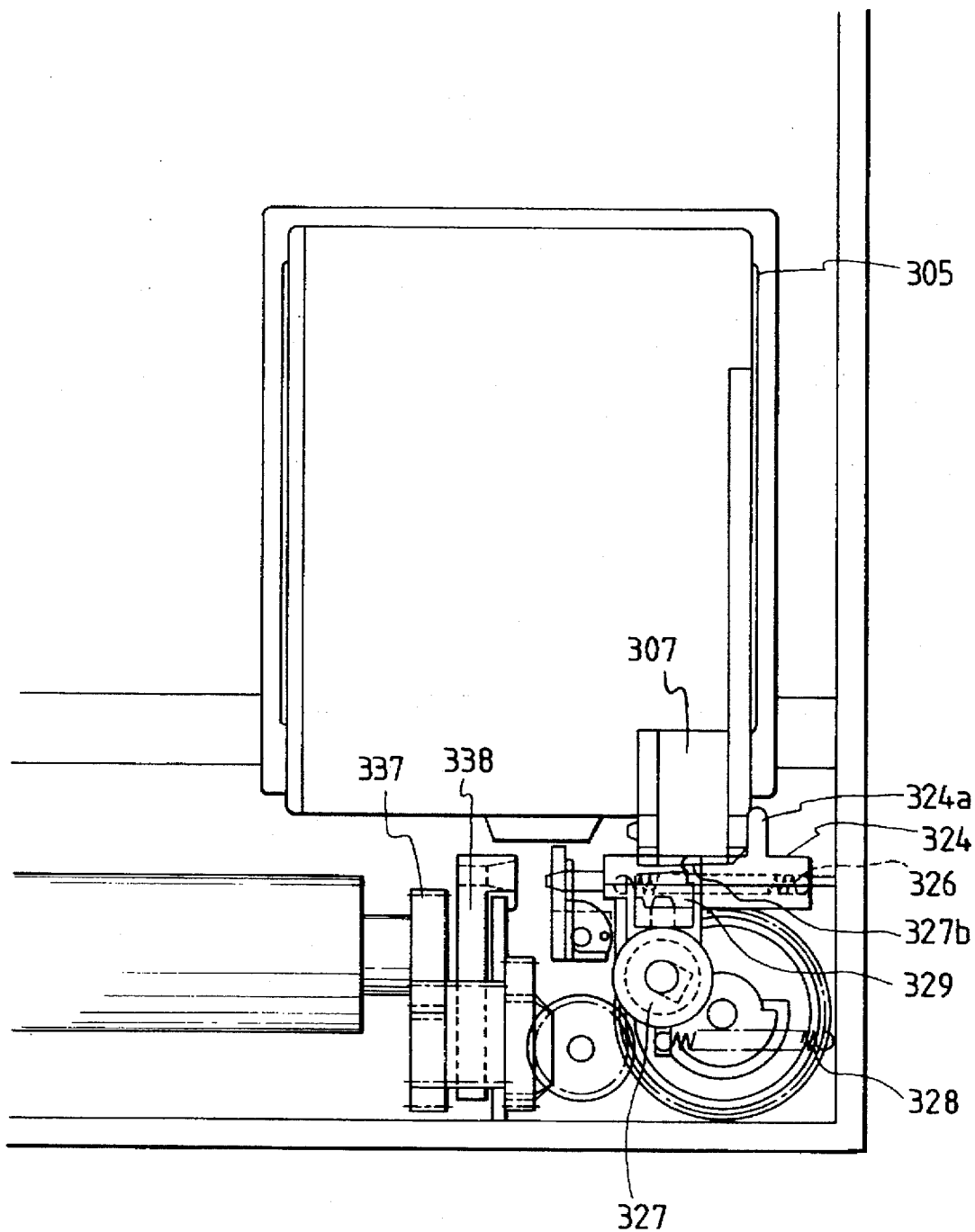

FIGS. 19 to 25 show a recording apparatus according to the third embodiment of the present invention. FIGS. 19 to 21 are front views of the recording apparatus, and FIGS. 22 to 25 are right side views of the recording apparatus. FIG. 19 shows a condition that a recording head 307 is uncapped and a switching lever is fixed at a neutral position, FIG. 20 shows a condition that the recording head is uncapped and the switching lever is free to permit the switching operation, and FIG. 21 shows a condition that the recording head is capped and the switching lever is free to permit the switching operation.

In FIG. 19, the recording head 307 is mounted on a carriage so that ink is discharged downwardly and the recording head can be shifted to the left and right direction along a guide shaft 306 to effect the recording. A sheet P urged against a convey roller 302a is conveyed vertically and downwardly. The convey roller 302a is controlled so that a rotational force of the convey roller is transmitted to a pump gear 319 via a feed gear 337 by the action of a switching lever 338 or is not transmitted to the pump gear. The pump gear 319 is so designed that it drives a pump cam 322 via pump gears 320, 321.

A wiper 323 is mounted to extend in a direction perpendicular to a shifting direction of the carriage 305 so that the wiper can sweep an ink discharge surface of the recording head 307 as the carriage is shifted. Further, a slide lever 324 is mounted to shift to the left and right direction along a slide rail 325 and is biased to the left by a slide spring 326. A head abutment portion 324a is formed on the slide lever 324 so that when the recording head 307 is positioned to the left from a position of FIG. 19 the head abutment portion is spaced apart from the recording head and when the recording head is shifted to the right the head abutment portion is abutted against the recording head 307, thereby shifting the slide lever 324 to the right.

A cylinder 327 is rotatably mounted for rotational movement around a rotation axis 327a and is biased in an anti-clockwise direction by a cylinder spring 328. Normally, as shown in FIG. 19, the cylinder is positioned so that a cap 329 directly connected to the cylinder 327 is inclined obliquely. Further, an engagement portion 327b extending below the cap 329 is formed on the cylinder 327 so that, when the slide lever 324 is shifted to the right, the engagement portion is engaged by a cylinder drive portion 324b formed on the slide lever 324.

FIG. 21 shows a condition that the carriage 305 has been shifted to the right from the position of FIG. 19. By pushing the head abutment portion 324a of the slide lever 324 by the recording head 307, the slide lever 324 is shifted to the right along the slide rail 325 in opposition to a biasing force of the slide spring 326. As the slide lever 324 is shifted, the cylinder drive portion 324b (FIG. 22) of the slide lever 324 is engaged by the engagement portion 327b of the cylinder 327, thereby rotating the cylinder in a clockwise direction in opposition to the cylinder spring 328, so that the cap 329 directly connected to the cylinder 327 faces the recording head 307 to cap or cover the ink discharge surface of the recording head.

Figure 22:
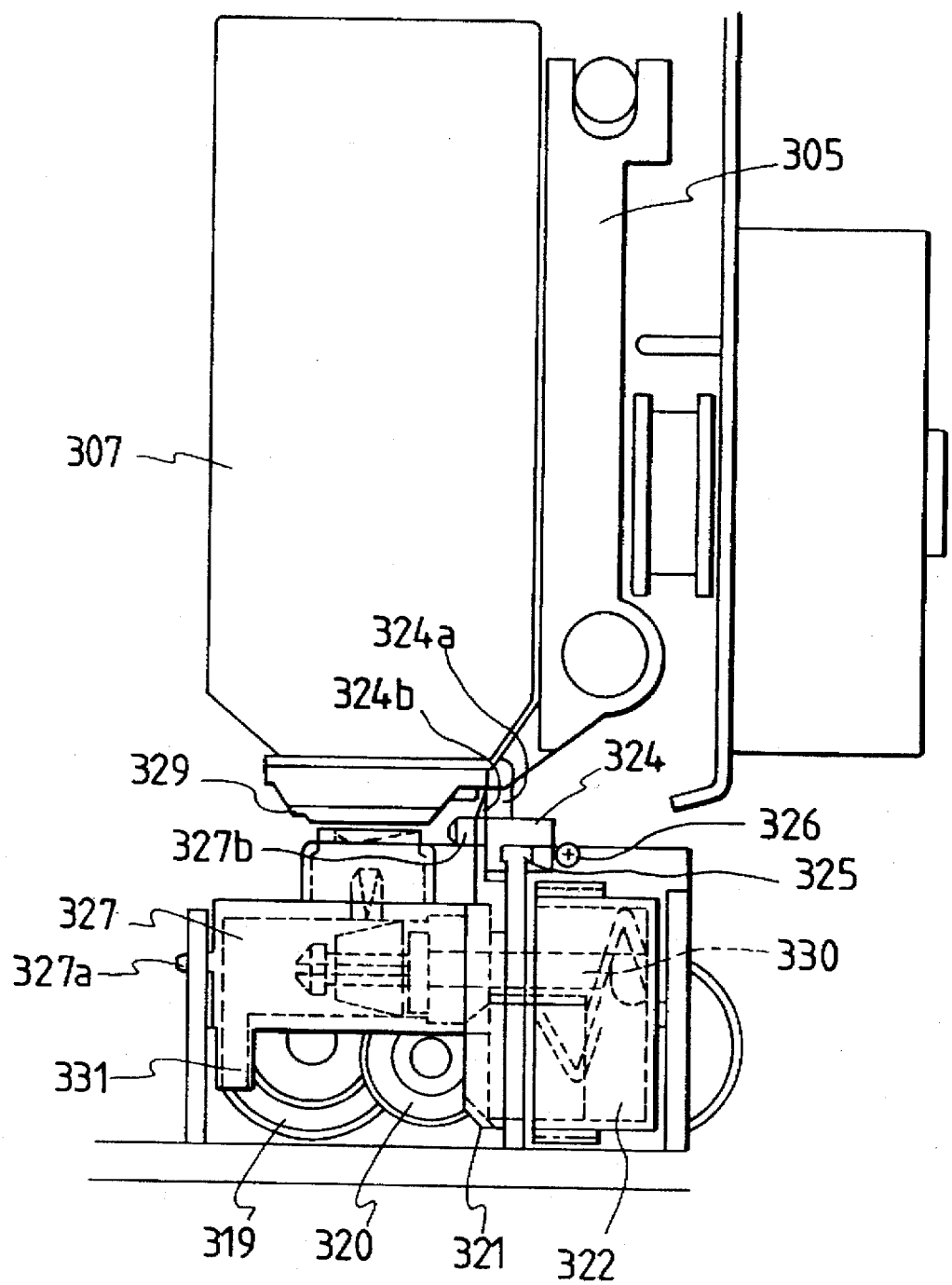
FIG. 22 is a side view of the gear switching device of FIG. 19.
Figure 23:
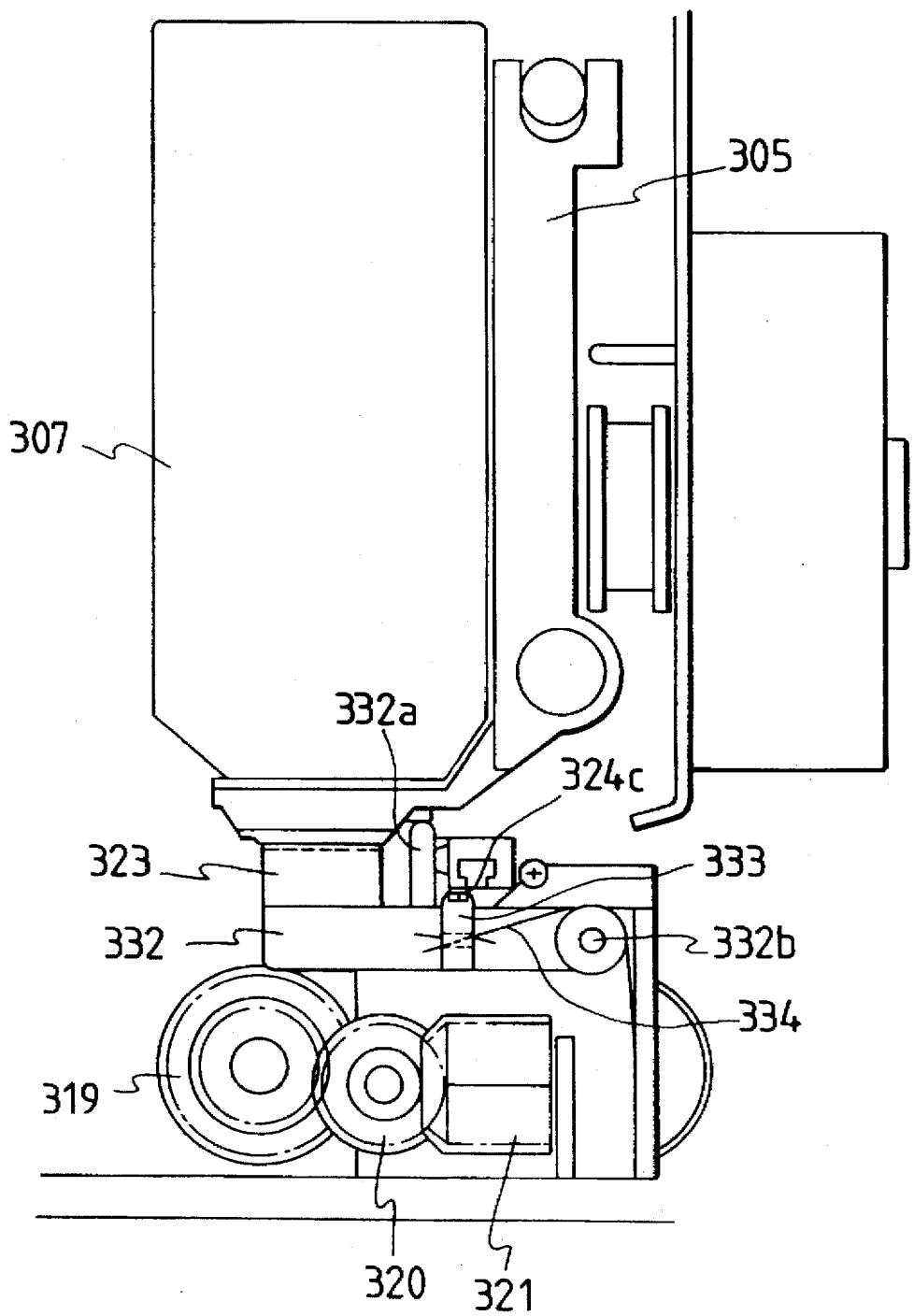
FIGS. 23 to 25 are side views showing the operation of the gear switching device of FIG. 19.

FIG. 20 shows a condition that the carriage 305 is positioned between the position of FIG. 19 and the position of FIG. 21 and the recording head is uncapped and the switching lever 338 can be moved. FIGS. 22 and 23 are side views showing the cylinder and the wiper portion. FIG. 22 shows a condition that the engagement portion 327b of the cylinder 327 has been pushed by the cylinder drive portion 324b of the slide lever 324 and the cylinder 327 has been rotated around the rotation axis 327a to cap or cover the ink discharge surface of the recording head 307.

A piston 330 is mounted in the cylinder 327 for sliding movement in the left and right direction. When the pump cam 322 is rotated, the piston 330 is shifted to the left and right by a cam surface formed on the pump cam 322, thereby absorbing the ink through the cap 329. The waste ink is discharged through a waste ink tube 331.

In FIG. 23, the wiper 323 is secured to a wiper holder 332, and an overlap amount between the wiper 323 and the recording head 307 is controlled by a protruded portion 332a of the wiper holder having a cam profile following the right side surface of the ink discharge portion of the recording head 307. Incidentally, the wiper holder 332 can be rotatably mounted for rotational movement around a rotation axis 332b and is biased toward the recording head 307 by a wiper spring 334 via a wiper cam 333 rotatably mounted on the wiper holder 332.

When the carriage 305 is shifted to the right (FIGS. 19 and 20), the wiper 323 pushes aside the wiper cam 333 in opposition to the biasing force of the wiper spring 334 by the wiper cam portion 324c of the slide lever 324, so that the wiper sweeps the recording head with the overlap amount determined by the protruded portion 332a of the wiper holder. On the other hand, when the carriage 305 is shifted to the left, since the wiper cam 333 is held by the wiper holder 332, it is pushed downwardly (in FIG. 23) by the wiper cam portion 324c of the slide lever 324, thereby rotating the wiper holder 332 in the anti-clockwise direction around the rotation axis 332b in opposition to the wiper spring 334 to separate the wiper 323 from the ink discharge surface of the recording head 307.

Figure 24:
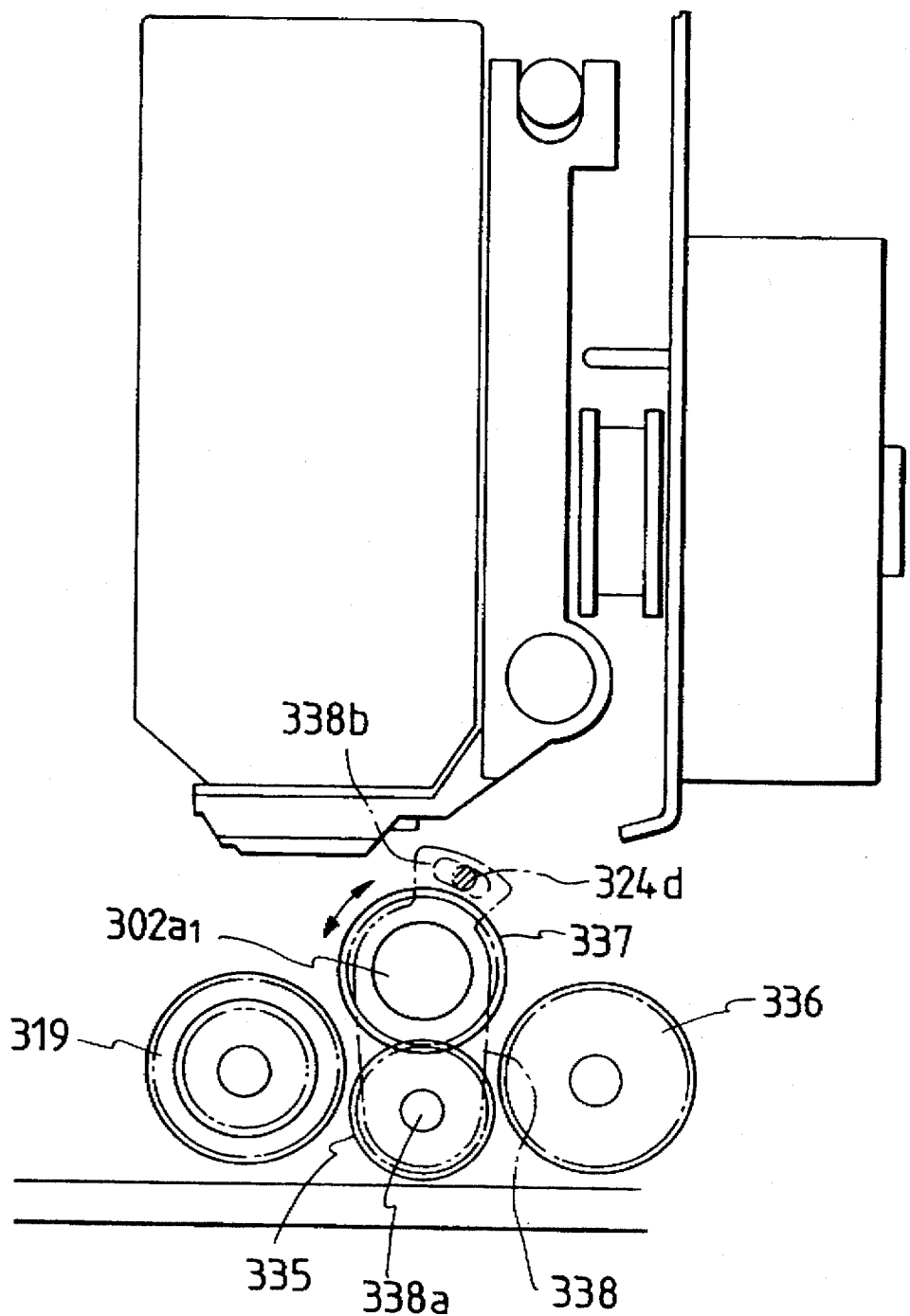

Next, the drive switching will be explained with reference to FIGS. 24, 25 and 19 to 21. FIGS. 19 and 24 show a condition that the switching lever 338 is fixed at the neutral position.

The switching lever 338 is rotatably mounted for rotational movement around a roller shaft $302a_1$ of the convey roller and has a pendulum gear 335 mounted on a pendulum shaft 338a attached to a lower end portion of the switching lever 338. When the convey roller 302a is rotated, a feed gear 337 secured to the roller shaft $302a_1$ of the convey roller applies a force to the pendulum gear 335 in a pressurizing direction depending upon the rotational direction of the feed gear 337, thereby rotating the switching lever 338 rotatably supporting the pendulum gear 335 around the roller shaft $302a_1$. For example, when the feed gear 337 is rotated in a clockwise direction (FIG. 24), the switching lever 338 is also rotated in the clockwise direction, thereby engaging the pendulum gear 335 with the pump gear 319. To the contrary, when the feed gear 337 is rotated in an anti-clockwise direction, the switching lever 338 is also rotated in the anti-clockwise direction, thereby engaging the pendulum gear 335 with an ASF gear 336 to apply the rotational force of the convey roller 302a and the force for driving the ASF to the ASF gear 336.

However, in the condition shown in FIGS. 19 and 24, the slide lever 324 is not shifted to the right (FIG. 19) and a pin portion 324d formed on the left end of the slide lever 324 is deeply engaged by a pin receiving portion 338b formed in the switching lever 338. The pin receiving portion 338b of the switching lever 338 comprises a tapered hole having an inlet (this side in a direction perpendicular to the plane of FIG. 24) as shown by the broken line and an bottom (that side in the direction perpendicular to the plane of FIG. 24) shaped to accommodate the pin portion 324d of the slide lever. Thus, when the slide lever 324 is positioned at the position shown in FIGS. 19 and 24, the pin portion 324d is deeply received in the pin receiving portion 338b of the switching lever 338, so that the switching lever 338 is positioned at the neutral position shown in FIG. 24, i.e. the pendulum gear 335 is not engaged by both of the pump gear 319 and the ASF gear 336, with the result that the pendulum gear 335 is rotated idly by the rotational force of the convey roller 302a. Normally, the feeding of the sheet is effected in the condition shown in FIG. 24.

Figure 25:
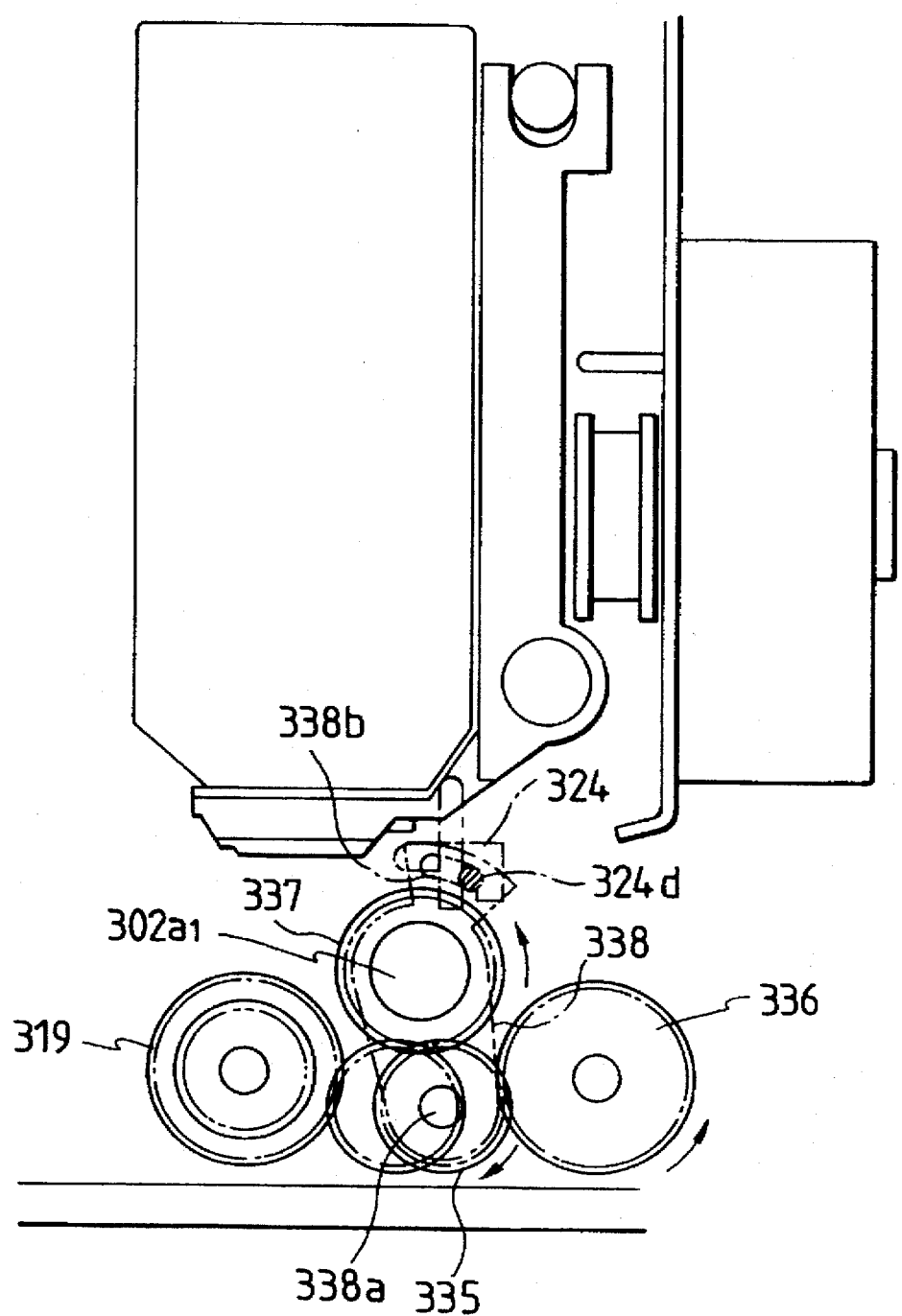

Next, FIGS. 20, 21 and 25 will be explained.

As mentioned above, when the carriage 305 is shifted to the right, the slide lever 324 is shifted to the right, with the result that the pin portion 324d formed on the left end of the slide lever 324 is disengaged from the pin receiving portion 338b formed in the switching lever 338. Thus, the rotation of the switching lever 338 is permitted as shown in FIG. 25. Accordingly, for example, when the feed gear 337 is rotated in the anti-clockwise direction, the switching lever 338 is also rotated in the anti-clockwise direction, thereby engaging the pendulum gear 335 rotatably supported on the switching lever 338 with the ASF gear 336. To the contrary, when the feed gear 337 is rotated in the clockwise direction, the switching lever 338 is also rotated in the clockwise direction, thereby engaging the pendulum gear 335 with the pump gear 319. In this way, only when the carriage 305 is positioned at the position shown in FIGS. 20 and 21, the pump is driven by the clockwise rotation of the convey roller 302a and the ASF is driven by the anti-clockwise rotation of the convey roller.

Next, an operation for separating the pendulum gear 335 from the ASF gear 336 or the pump gear 319 after the respective driving was effected by the engagement between the pendulum gear 335 and the ASF gear 336 or the pump gear 319 will be explained.

First of all, in order to engage the pendulum gear 335 with the ASF gear 336 or the pump gear 319, the pin portion 324d of the slide lever 324 must be disengaged from the pin receiving portion 338b of the switching lever 338. To this end, the slide lever 324 is shifted to the right (FIG. 24) by the carriage 305. In this case, since the carriage 305 is positioned at the position shown in FIG. 25, as mentioned above, the cylinder 327 is rotated by the cylinder drive portion 324b of the slide lever 324, thereby facing the cap 329 attached to the cylinder 327 to the ink discharge surface of the recording head 307 mounted on the carriage 305 to cap or cover the ink discharge surface.

From this condition, after the drives of the ASF and the pump were finished, the carraige 305 is shifted to the left (FIG. 21). In this case, if the sheet P was supplied, the recording start condition or recording waiting condition is established, and the slide lever 324 which was biased in opposition to the slide spring 326 is shifted to the left (downward direction perpendicular to the plane of FIG. 24) by the carriage 305, thereby abutting the tip end of the pin portion 324d of the slide lever 324 against the tapered surface of the pin receiving portion 338b of the switching lever 338, with the result that the tip end of the pin portion 324d is shifted while pushing the tapered surface to bring the switching lever 338 to the neutral position. Eventually, the pin portion 324d of the slide lever 324 is engaged by the pin receiving portion 338b of the switching lever 338, thereby disengaging the pendulum gear 335 held by the switching lever 338 from the ASF gear 336 or the pump gear 319 and maintaining the pendulum gear 335 to a neutral condition.

The pendulum gear 335 is expected to be disengaged from the ASF gear 336 or the pump gear 319 in this way. However, as described in connection with the prior art, actually, since the gears are engaged by each other without backlash and there are the residual stresses due to the deflection of the gears and the gear shafts between the gears, if the force of the slide spring 326 is small, the switching lever 338 cannot be shifted by the slide lever 324.

To avoid this, according to the present invention, the pendulum gear 335 is disengaged from the ASF gear 336 in synchronous with and by utilizing the registration operation effected by abutting the leading end of the sheet P against the nip between the convey roller 302a and the pinch roller 302a₁ upon the connection between the ASF gear 336 and the pendulum gear 335. In this way, the erroneous operation in the sheet supply is reduced and the sheet supply time is also reduced. Further, since the slide spring 326 having the small force can be used, it is possible to improve the assembling ability, to widen the selection range of the sizes of the spring and to reduce the required space.

Now, the operation of the above recording apparatus will be fully explained with reference to flow charts. Incidentally, the control for this operation is effected by a control means (not shown) as the controls shown in FIGS. 27 to 29A and 29B.

Figure 27:
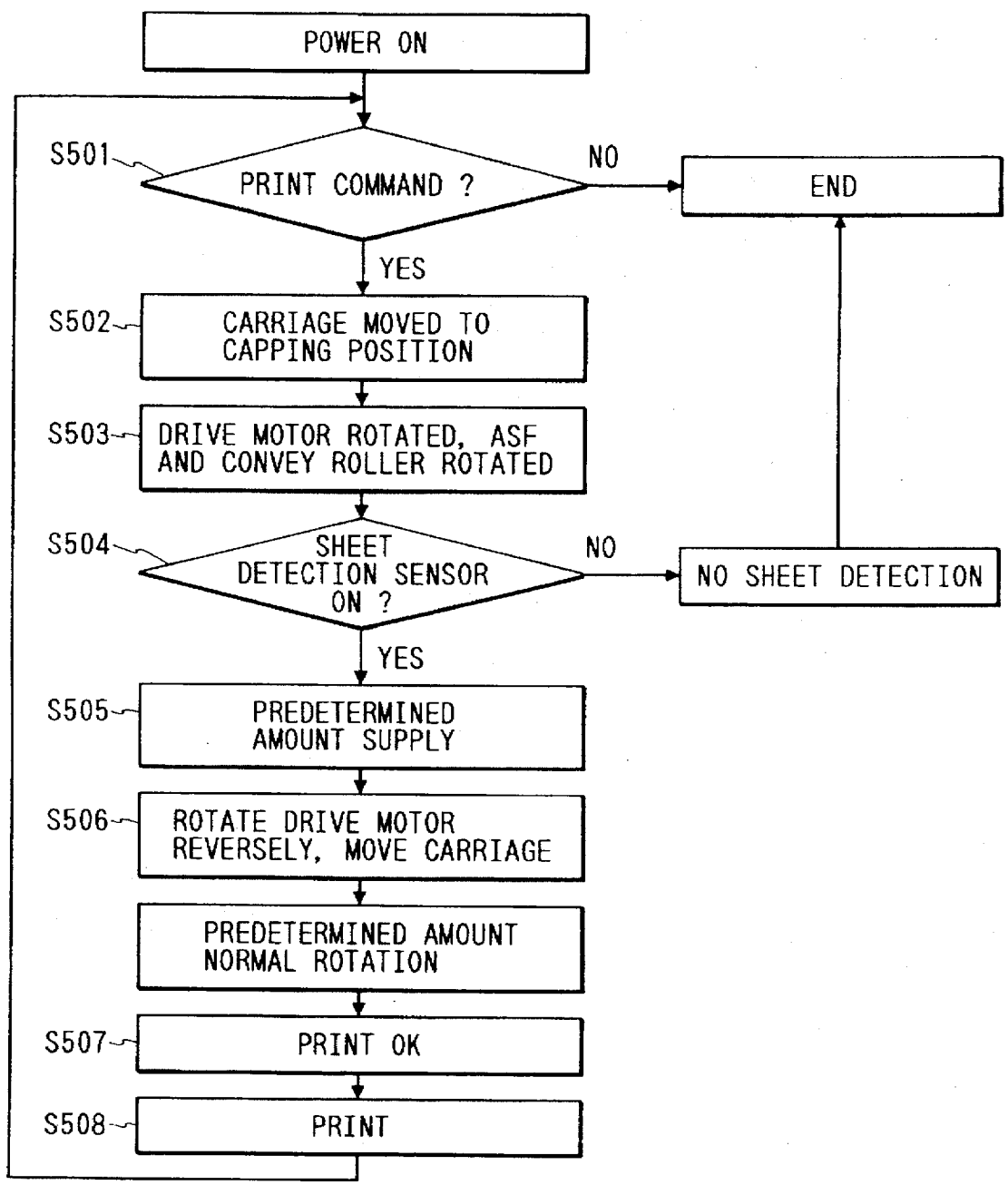

First of all, explaining the flow chart shown in FIG. 27, after a power source is turned ON, it is judged whether a recording command is inputted or not in a step S501. If the recording command is inputted, in a step S502, the carriage 305 is shifted to the capping position, thereby disengaging the slide lever 324 from the switching lever 338 to permit the free movement of the switching lever 338.

In a step S503, when the drive motor 309a is rotated normally, the drive gear 309b is connected to the ASF output gear 309d, and when the drive motor 309a is further rotated to rotate the convey roller 302a and the separation roller of the ASF, thereby starting the supply of the sheet P. In a step S504, the sheet P is detected by the sheet detection sensor 302b₅. When the sheet P is detected, in a step S505, the convey roller 302a continues to rotate to pinch the sheet P between the convey roller 302a and the pinch roller 302b₁ by a predetermined amount.

In a step S506, when the predetermined amount of the sheet P is pinched, the drive motor 309a is rotated reversely to effect the registration of the sheet, and, at the same time, the carriage 305 is shifted to bring the pendulum gear 335 to the neutral position, thereby disengaging the pendulum gear from the ASF gear 336. In this way, the gears can be disengaged from each other by utilizing the reverse rotation of the drive motor 309a for effecting the registration of the sheet. In order to perform the recovery operation in this condition, the carriage 305 is shifted to the capping position again by the control means, and the drive motor 309a is rotated reversely, thereby connecting the drive gear 309b to the pump gear 319 to effect the pumping operation.

After the registration of the sheet is finished, the drive motor 309a is rotated in the normal direction again by a predetermined amount to effect the protrusion of the sheet P, thereby establishing the recording permitting condition in a step S508, and, in a step S509, the recording is effected.

Figure 28:
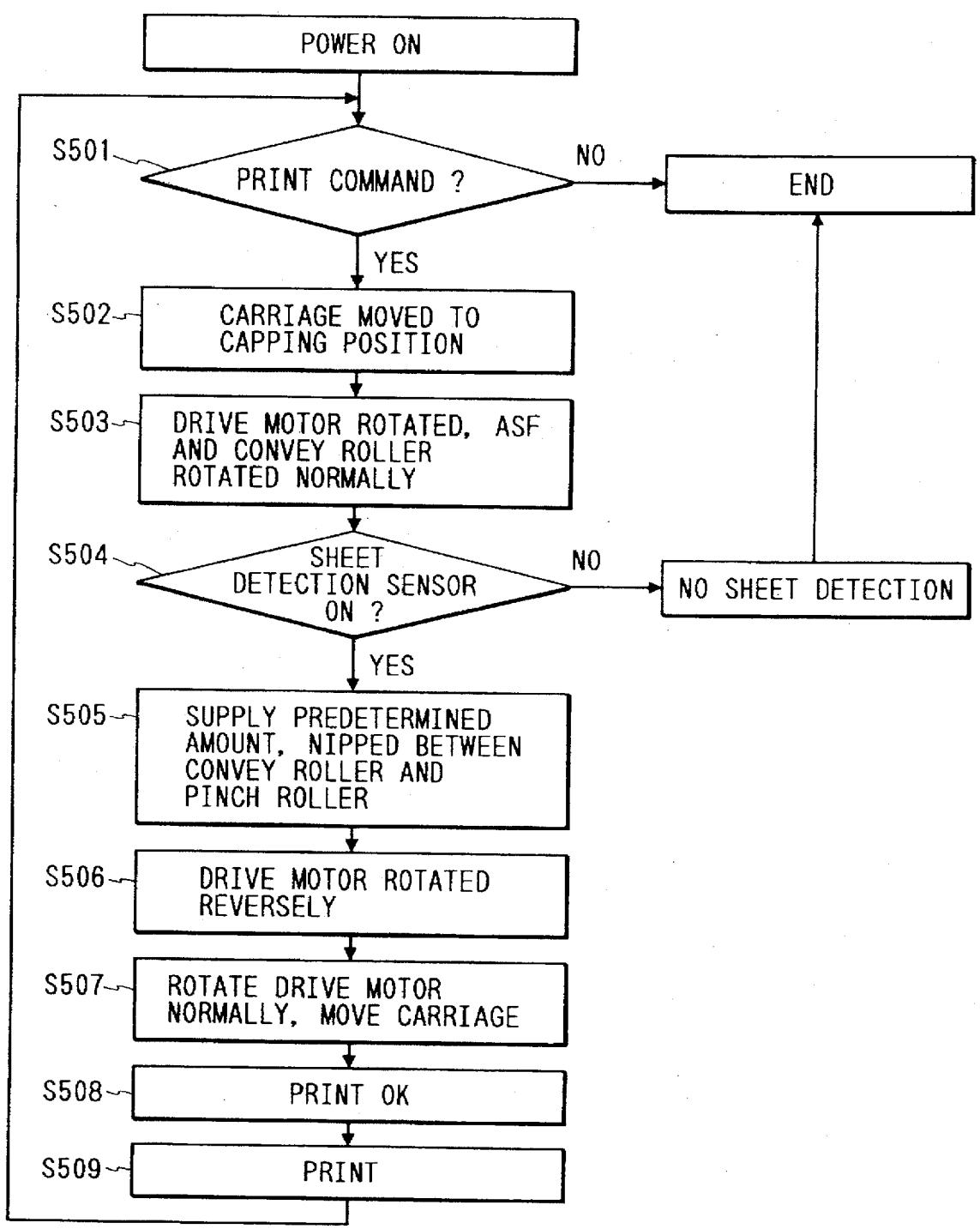

FIG. 28 is a flow chart showing another operation. This operation differs from that shown in FIG. 27 in connection with the steps S506 and S507.

In a step S506, when the predetermined amount of the sheet P is pinched, the drive motor 309a is rotated reversely to effect the registration of the sheet. However, in this case, the drive gear 309b is connected to the pump gear 319 by further rotating the drive motor 309a in the reverse direction, thereby starting the recovery operation.

After the recovery operation is finished, in a step S507, the drive motor 309a is rotated in the normal direction by a predetermined amount to effect the protrusion of the sheet P, and the carriage 305 is shifted to bring the pendulum gear 335 to the neutral position. By effecting the control in this way, the recovery operation is performed for each sheet P.

Figure 29B:
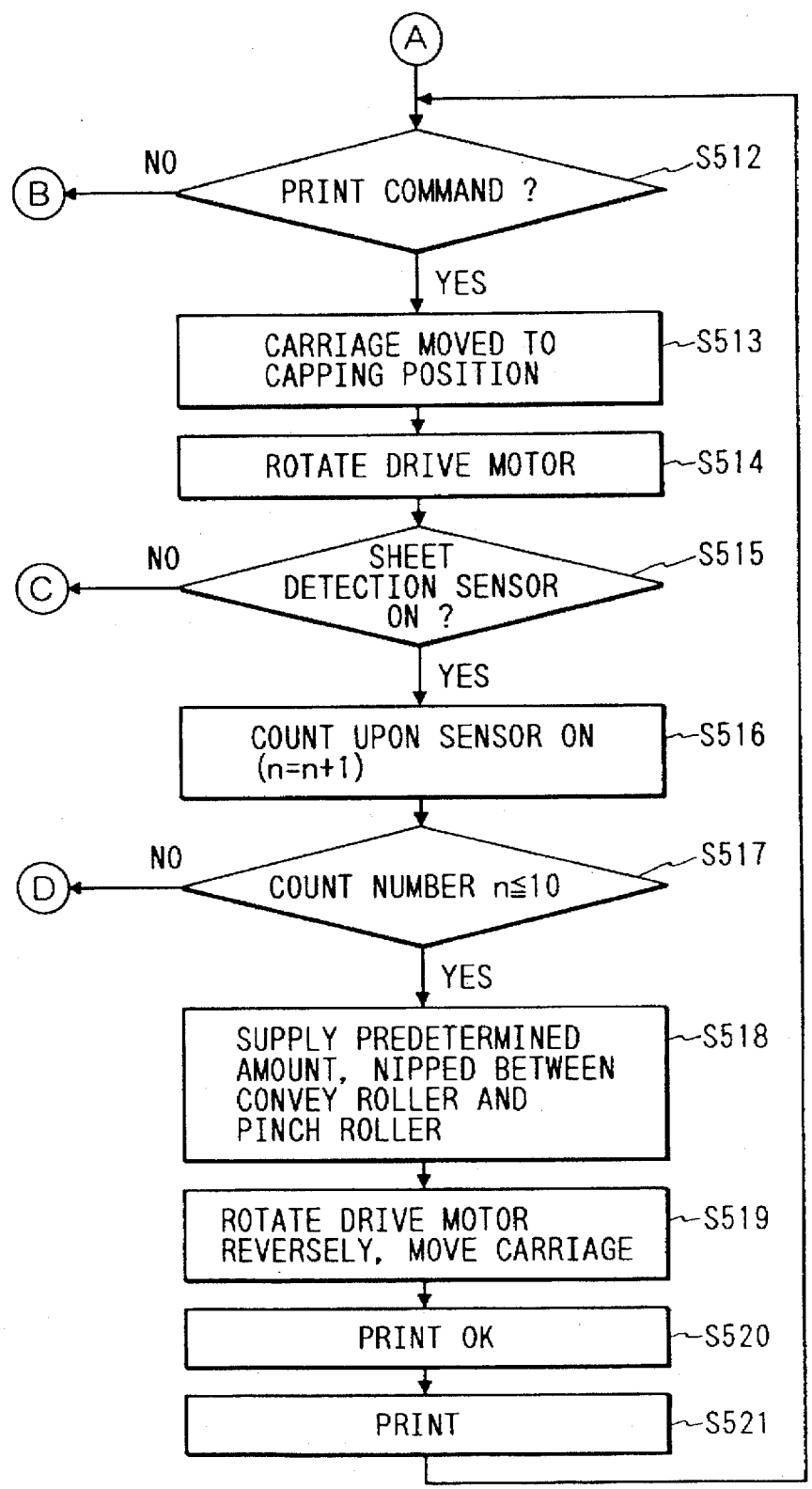

On the other hand, a flow chart in FIGS. 29A and 29B shows the control wherein the recovery operation is not performed for each sheet P but is performed whenever a predetermined number (10 in the illustrated embodiment) of sheets are recorded.

After a power source is turned ON, the number of sheets (n=11) is read in a step S501. Then, it is judged whether a recording command is inputted or not in a step S502. If the recording command is inputted, in a step S503, the carriage 305 is shifted to the capping position, thereby disengaging the slide lever 324 from the switching lever 338 to permit the free movement of the switching lever 338. In a step S504, when the frive motor 309a is rotated normally, the drive gear 309b is connected to the ASF output gear 309d, and when the drive motor 309a is further rotated to rotate the convey roller 302a and the separation roller of the ASF, thereby starting the supply of the sheet P.

In a step S505, the sheet P is detected by the sheet detection sensor $302b_5$. When the sheet P is detected, in a step S506, the convey roller 302a continues to rotate to pinch the sheet P between the convey roller 302a and the pinch roller $302b_1$ by a predetermined amount. In a step S507, when the predetermined amount of the sheet P is pinched, the drive motor 309a is rotated reversely to effect the registration of the sheet, and at the same time, the drive motor 309a continues to rotate reversely to effect the recovery operation, thereby connecting the drive gear 309b to the pump gear 319 to effect the pumping operation.

After the recovery operation is finished, in a step S608, the drive motor 309a is rotated in the normal direction again by a predetermined amount to effect the protrusion of the sheet P, and the carriage 305 is shifted to bring the pendulum gear 335 to the neutral position. Then, in a step S509, the recording permitting condition is established, and, in a step S510, the number of the recorded sheets P is initialized (n→0), and in a step S511, the recording is effected.

Then, in a step S512, when the recording command is inputted, in steps S513 to S515, the same operation as those in the steps S503 to S505 are performed, thereby effecting the sheet supply. In a step S516, the number of the recorded sheets P is counted, and, in a step S517, it is judged whether the counted number reaches a predetermined number (10 in the illustrated embodiment). If not, the recording is continued in steps S518 to S521.

In the step S517, if the counted number reaches the predetermined number, the program is returned to the step S506, thereby starting the recovery operation. By effecting the control in this way, the recovery operation is automatically effected whenever a predetermined number of sheets are recorded.

According to the above-mentioned embodiment, since the skew-feed of the sheet can be corrected without using any regist rollers, the number of parts can be reduced in comparison with the conventional cases, thereby making the recording apparatus inexpensive.

Further, according to the second embodiment, since the force of the slide spring can be made small, it is possible to widen the selection range of the sizes of the spring and to improve the assembling ability.

As mentioned above, since the gears are disengaged from each other by utilizing the reverse rotation of the rotary convey means for correcting the skew-feed of the sheet, it is possible to reduce the drive switching time.

Further, in the recording apparatus wherein the ink jet recording head is used as the recording means, since the switching means can drive the recovery mechanism upon the transmission of the reverse rotation to the rotary convey means, it is possible to reduce the sheet supplying time.

What is claimed is:

1. A sheet supplying apparatus, comprising:
   sheet supporting means for supporting a plurality of sheets;
   rotary supply means for feeding out a sheet supported on said sheet supporting means by rotation in a sheet supply direction;
   rotary convey means for conveying a sheet fed out by said rotary supply means, said rotary convey means conveying the sheet in a normal convey direction for a predetermined amount, and then conveying the sheet in a reverse direction so as to form a loop in the sheet between said rotary supply means and said rotary convey means, thereby to register the sheet;
   drive means for rotatably driving said rotary convey means in a normal convey direction and a reverse direction;
   switching means pivotable in response to rotation of the rotary convey means;
   an output gear provided on said pivotable switching means and connected to said drive means; and
   an input gear connected to said rotary supply means;
   wherein said switching means is rocked to engage said output gear to said input gear to thereby transmit a rotational driving force from said drive means to said rotary supply means for rotating said rotary supply means in the sheet supply direction when said rotary convey means is rotated in the normal convey direction, and said output gear is disengaged from said input gear when said rotary convey means is rotated in the reverse direction.

2. A sheet supplying apparatus according to claim 1, wherein said switching means comprises a pivotable arm provided on a rotation axis of said rotary convey means.

3. A sheet supplying apparatus according to claim 1, wherein said rotary convey means has a convey roller driven by said drive means and a pinch roller urged against said convey roller, and wherein a sheet fed out by said rotary supply means is conveyed by a predetermined amount by rotation of said convey roller in a normal convey rotation direction, and then said convey roller is rotated in a reverse direction to feed the sheet back in a reverse convey direction, thereby abutting a tip end of the sheet against a nip formed between said convey roller and said pinch roller to effect registration of the sheet.

4. A sheet supplying apparatus according to claim 1, further comprising:
   control means for controlling an operation of said drive means by applying a number of pulses to said drive means during reverse rotation of said rotary convey means so that a driving force non-transmitting time period from a time when a sheet is registered until a time when the output gear is engaged by said input gear is minimized.

5. A sheet supplying apparatus according to claim 4, wherein the number of pulses applied to said drive means which minimizes said driving force non-transmitting time period is set so that phases of said switching output gear and said input gear coincide with each other when said switching output gear and said input gear are engaged.

6. A sheet supplying apparatus according to claim 4, wherein said switching means comprises a pivotable arm provided on a rotation axis of said rotary convey means.

7. A sheet supplying apparatus according to claim 6, wherein said rotary convey means comprises a convey roller driven by said drive means and a pinch roller urged against said convey roller, and wherein a sheet fed out by said rotary supply means is conveyed by a predetermined amount by rotation of said convey roller in a normal convey direction, and then said convey roller is rotated in a reverse direction to feed the sheet back in a reverse convey direction, thereby abutting a tip end of the sheet against a nip formed between said convey roller and said pinch roller to effect registration of the sheet.

8. A sheet supplying apparatus according to claim 1, further comprising regulating means for regulating rotation of said rotary supply means in the reverse direction when forming a loop in the sheet.

9. A sheet supplying apparatus according to claim 8, wherein said regulating means is a clutch spring provided within a clutch gear of transmission means for transmitting the rotation force to said rotary supply means.

10. A sheet supplying apparatus according to claim 1, wherein said rotary supply means comprises a supply roller, an outer periphery of which includes an arched portion and a portion that is partially cut off, and wherein after a loop is formed in the sheet by the arched portion of the roller, the supply roller stops in a state where the partially cut-off portion faces the plurality of sheets supported on said supporting means.

11. A recording apparatus, comprising:
sheet supporting means for supporting a plurality of sheets;
rotary supply means for feeding out a sheet supported on said sheet supporting means by rotation in a sheet supply direction;
rotary convey means for conveying a sheet fed out by said rotary supply means, said rotary convey means conveying the sheet in a normal convey direction for a predetermined amount, and then conveying the sheet in a reverse direction so as to form a loop in the sheet between said rotary supply means and said rotary convey means, thereby to register the sheet;
drive means for rotatably driving said rotary convey means in a normal convey direction and a reverse direction;
switching means pivotable in response to rotation of the rotary convey means;
an output gear provided on said pivotable switching means and connected to said drive means;
an input gear connected to said rotary supply means,
wherein said switching means is rocked to engage said output gear to said input gear to thereby transmit a rotational driving force from said drive means to said rotary supply means for rotating said rotary supply means in the sheet supply direction when said rotary convey means is rotated in the normal convey direction, and said output gear is disengaged from said input gear when said rotary convey means is rotated in the reverse direction;
recording means for recording an image on a sheet conveyed by said convey means after registration of the sheet.

12. A recording apparatus according to claim 11, wherein said recording means is ink jet recording means comprising an electro-thermal converter driven in response to a signal, and wherein an image is formed by discharging ink from a discharge opening by utilizing a pressure change caused by expansion and contraction of a bubble due to film boiling generated by thermal energy applied to said electro-thermal converter.

13. A sheet supplying apparatus according to claim 11, wherein said switching means comprises a pivotable arm provided on a rotation axis of said rotary convey means.

14. A recording apparatus, comprising:
sheet supporting means for supporting a plurality of sheets;
rotary supply means for feeding out a sheet supported on said sheet supporting means by rotation of said rotary supply means in a normal supply direction;
rotary convey means for conveying a sheet fed out by said rotary supply means, said rotary convey means conveying the sheet in a normal convey direction for a predetermined amount, and then conveying the sheet in a reverse direction so as to form a loop in the sheet between said rotary supply means and said rotary convey means, thereby to register the sheet;
drive means for rotatably driving said rotary convey means in a normal convey direction and a reverse direction;
switching means pivotable in response to rotation of the rotary convey means
an output gear provided on said pivotable switching means and connected to said drive means; and
an input gear connected to said rotary supply means;
wherein said switching means is rocked to engage said output gear to said input gear to thereby transmit a rotational driving force from said drive means to said rotary supply means for rotating said rotary supply means in the sheet supply direction when said rotary convey means is rotated in the normal convey direction, and said output gear is disengaged from said input gear when said rotary convey means is rotated in the reverse direction;
control means for controlling said drive means during reverse rotation of said rotary convey means by applying a number of pulses to said drive means so that a driving force non-transmitting time period from a time a sheet is registered until a time the switching output gear is engaged by said input gear is minimized; and
recording means for recording an image on a sheet conveyed by said convey means after registration of the sheet.

15. A recording apparatus according to claim 14, wherein said recording means is ink jet recording means comprising an electro-thermal converter driven in response to a signal, and wherein an image is formed by discharging ink from a discharge opening by utilizing a pressure change caused by expansion and contraction of a bubble due to film boiling generated by thermal energy applied to said electro-thermal converter.

* * * * *

UNITED STATES PATENT AND TRADEMARK OFFICE
CERTIFICATE OF CORRECTION

PATENT NO. : 5,672,019      Page 1 of 3
DATED : September 30, 1997
INVENTOR(S) : SOICHI HIRAMATSU, ET AL.

It is certified that error appears in the above-identified patent and that said Letters Patent is hereby corrected as shown below:

On title page,

<u>At [30] Foreign Application Priority Data</u>

Add, "January 7, 1992 [JP] Japan 4-807--.

On drawing

<u>Sheet 13</u>

Figure 13, "PROTRUDE" should read --PROTRUDES--.

<u>Column 1</u>

Line 8, "relates" should read --relates to--.
    Line 13, "machine" should read --machines--.
    Line 26, "registrated" should read --registered--.

<u>Column 2</u>

Line 39, "comprises" should read --comprising--.

<u>Column 6</u>

Line 2, "made to" should read --made of--.

<u>Column 7</u>

Line 48, "with" should read --without--.

UNITED STATES PATENT AND TRADEMARK OFFICE
CERTIFICATE OF CORRECTION

PATENT NO. : 5,672,019 Page 2 of 3
DATED : September 30, 1997
INVENTOR(S) : Soichi Hiramatsu, et al.

It is certified that error appears in the above-identified patent and that said Letters Patent is hereby corrected as shown below:

Column 8

Line 17, "cylidrical" should read --cylindrical--.

Column 9

Line 44, "concerns to" should read --concerns--.

Column 10

Line 22, "83" should read --83 engages--.
    Line 47, "it can" should read --can--.

Column 12

Line 10, "carvature" should read --curvature--.

Column 14

Line 7, "in" should be deleted.

Column 16

Line 14, "0n" should read --On--.

UNITED STATES PATENT AND TRADEMARK OFFICE
CERTIFICATE OF CORRECTION

PATENT NO. : 5,672,019 Page 3 of 3
DATED : September 30, 1997
INVENTOR(S) : Soichi Hiramatsu, et al.

It is certified that error appears in the above-identified patent and that said Letters Patent is hereby corrected as shown below:

<u>Column 19</u>

Line 10, "frive" should read --drive--.
    Line 51, "regist" should read --register--.

<u>Column 21</u>

Line 55, "direction;" should read --direction; and--.

<u>Column 22</u>

Line 28, "means" should read --means;--.

Signed and Sealed this

Twenty-fourth Day of March, 1998

Attest:

BRUCE LEHMAN

*Attesting Officer*      *Commissioner of Patents and Trademarks*